United States Patent
Brussa et al.

(10) Patent No.: US 11,072,490 B2
(45) Date of Patent: Jul. 27, 2021

(54) PACKAGING ASSEMBLY FOR THE TRANSPORT AND STORING OF ROASTED COFFEE AND METHOD FOR PACKAGING ROASTED COFFEE BEANS

(71) Applicant: ILLYCAFFE' S.p.A., Trieste (IT)

(72) Inventors: David Brussa, Trieste (IT); Oriana Savonitti, Trieste (IT); Alessandra Lodato, Trieste (IT); Barbara Mazzon, Trieste (IT)

(73) Assignee: ILLYCAFFE' S.p.A., Trieste (IT)

( * ) Notice: Subject to any disclaimer, the term of this patent is extended or adjusted under 35 U.S.C. 154(b) by 637 days.

(21) Appl. No.: 15/760,514

(22) PCT Filed: Sep. 20, 2016

(86) PCT No.: PCT/IB2016/055609
§ 371 (c)(1),
(2) Date: Mar. 15, 2018

(87) PCT Pub. No.: WO2017/051314
PCT Pub. Date: Mar. 30, 2017

(65) Prior Publication Data
US 2019/0039821 A1    Feb. 7, 2019

(30) Foreign Application Priority Data

Sep. 21, 2015 (IT) .......................... 102015000053561
Mar. 25, 2016 (IT) .......................... 102016000031676

(51) Int. Cl.
*B65D 88/16* (2006.01)
*B65B 1/04* (2006.01)
(Continued)

(52) U.S. Cl.
CPC .......... *B65D 88/1618* (2013.01); *A23F 5/105* (2013.01); *B65B 1/04* (2013.01);
(Continued)

(58) Field of Classification Search
CPC ... A23F 5/105; B65D 88/1618; B65D 77/061; B65D 81/2061; B65D 88/1681;
(Continued)

(56) References Cited

U.S. PATENT DOCUMENTS 6,244,443 B1    6/2001  Nickell et al.
2014/0097118 A1    4/2014  Beer

FOREIGN PATENT DOCUMENTS

GB         2390355 A       1/2004
WO       2014/147159 A1    9/2014

OTHER PUBLICATIONS

International Search Report PCT/IB2016/055609 dated Jan. 3, 2017.

*Primary Examiner* — Anthony D Stashick
*Assistant Examiner* — James M Van Buskirk
(74) *Attorney, Agent, or Firm* — Arent Fox LLP; Michael Fainberg

(57) ABSTRACT

Packaging assembly for the transport of coffee in the form of roasted beans, comprising: at least one impermeable bag, impermeable at least to oxygen and water vapour; said at least one impermeable bag being flexible and sealable in a watertight manner to prevent the introduction of fluids or gases; at least one unidirectional valve sealingly applied to said at least one impermeable bag which only allows gas to escape from the impermeable bag preventing the entry of gas into the impermeable bag, wherein said at least one unidirectional valve makes it possible to achieve an overpressure inside the impermeable bag variable from 3 to 60 mbar.

8 Claims, 36 Drawing Sheets

(51) Int. Cl.
    *B65B 31/04*     (2006.01)
    *B65B 5/04*     (2006.01)
    *B65B 25/00*     (2006.01)
    *B65D 77/06*     (2006.01)
    *A23F 5/10*     (2006.01)
    *B65B 11/02*     (2006.01)
    *B65D 81/20*     (2006.01)
    *B65D 77/22*     (2006.01)
    *B65B 29/00*     (2006.01)
    *B65B 31/00*     (2006.01)
    *B65B 5/06*     (2006.01)

(52) U.S. Cl.
    CPC .................. *B65B 5/04* (2013.01); *B65B 5/06* (2013.01); *B65B 11/025* (2013.01); *B65B 25/001* (2013.01); *B65B 29/00* (2013.01); *B65B 31/00* (2013.01); *B65B 31/042* (2013.01); *B65D 77/061* (2013.01); *B65D 77/225* (2013.01); *B65D 81/2061* (2013.01); *B65D 81/2084* (2013.01); *B65D 88/1681* (2013.01); *B65D 2588/165* (2013.01)

(58) Field of Classification Search
    CPC .............. B65D 81/2084; B65D 77/225; B65D 2588/165; B65D 33/01; B65D 2205/02; B65B 25/001; B65B 11/025; B65B 5/06; B65B 31/00; B65B 31/042; B65B 29/00; B65B 5/04; B65B 1/04
    USPC .................. 383/100, 102, 103, 113, 119, 67; 206/524
    See application file for complete search history.

US 11,072,490 B2

PACKAGING ASSEMBLY FOR THE TRANSPORT AND STORING OF ROASTED COFFEE AND METHOD FOR PACKAGING ROASTED COFFEE BEANS

CROSS-REFERENCE TO RELATED APPLICATIONS

This application is the U.S. National Stage Application of International Patent Application No. PCT/IB2016/055609, filed on Sep. 20, 2016, which claims priority to Italian Patent Application No. 102016000031676, filed on Mar. 25, 2016 and Italian Patent Application No. 102015000053561, filed on Sep. 21, 2015, the contents of each of which is incorporated herein by reference in its entirety.

FIELD OF APPLICATION

This invention relates to a packaging assembly for the transport and/or storing of roasted coffee and a method of filling and transport of said assembly. According to an embodiment, said roasted coffee is in the form of beans. According to an embodiment of said roasted coffee is ground.

In particular, this invention relates to an assembly for the packaging of large amounts of roasted coffee so that it can also be transported over long distances in long periods of time and possibly stored or warehoused.

STATE OF THE ART

As is well known, to preserve the coffee in the best conditions, in particular that already roasted, it is necessary to isolate it from the outside environment, preventing air from entering into contact with the coffee, preventing large amounts of oxygen and humidity from coming into contact with the oils present in coffee after its roasting.

In fact, preventing the oxidation of the oils present in roasted coffee avoids its being rancid and, in this way, allows the preservation of the aromas and flavours of freshly roasted coffee.

Equally important is preventing contact of the roasted coffee with moisture in the air that can trigger processes of rancidity with very high potential negative effect on the organoleptic characteristics of the coffee.

Roasted coffee can be preserved by enclosing it in sacks under vacuum or otherwise sealed. However, these known sacks, usually small (a few tens of doses) and these known methods, do not allow the storage of large amounts of coffee, especially in security, where it is decided to store these packages in the warehouse or transport them with long transport and storage times.

Therefore, small sacks are known for the storage of roasted coffee in the form of beans or ground. However, these known solutions are unsuitable for transporting coffee to great distances, or to warehouse it for long periods, particularly in large quantities for possible subsequent industrial processing.

Documents U.S. Pat. Nos. 6,213,645, 6,602,590, JPH10167335, and GB552804 show of sack solutions of this type.

However, the roasted coffee contains gases that develop during its roasting, in particular carbon dioxide, which is slowly released from the roasted bean in the 2-15 days after roasting. Consequently, after the packing and sealing of the sack, the internal pressure is increased due to the emission of gas contained in the coffee.

To eliminate this drawback, sacks are known fitted with unidirectional valves that discharge part of the gas present in the head space of the sack into the external environment, reducing the pressure inside the sack as soon as it is formed.

A valve solution that prevents the formation of over-pressure inside the sack is for example known from document GB1204462 which shows a unidirectional valve applicable to an opening of the sack so as to allow the immediate outflow of gas upon the creation of over-pressure inside, but at the same time preventing the access of air inside the sack and preventing it from coming into contact with the coffee.

This need is particularly felt when one wishes to transport or store for long periods, large quantities of coffee that release large amounts of gas that are difficult to regulate. Therefore, in the past, it was always preferable to transport raw, or green, coffee beans and proceed to its roasting only upon arrival in the vicinity of the area of its use and at the time of the further processing of the coffee bean.

However, the coffee roasting process is strongly influenced by the environmental conditions of the roasting plant which therefore does not allows replicating the aromas and flavours in an environment that lacks the ideal conditions.

Documents U.S. Pat. Nos. 4,365,715, 6,663,284, 7,588,160, KR101004262 and WO2011030244, show solutions of sacks fitted with unidirectional valves suitable for the conservation of small quantities of coffee. However, all these solutions show sacks capable of receiving small quantities that release small quantities of gas and therefore easily controllable.

In particular US2014097118 shows a first sack of modest capacity and provided with a unidirectional valve for degassing its contents in the event of over-pressure. A plurality of these first small sacks is received in a second flexible sack also provided with a unidirectional valve. The two valves are calibrated so as to maintain the internal pressure of the second sack not less than the working pressure of the first. The second sack is placed in a rigid container, for example of corrugated cardboard.

This known solution is extremely complex to implement especially if one wishes to transport or store a large quantity of already roasted coffee while avoiding the use of many small containers.

A further known solution of this type that however has the same disadvantages is known from GB2390355-A.

State of the art systems are also known for transporting large quantities of roasted coffee in single polypropylene sacks, which have no barrier against air and humidity, exposing the coffee to rancidity.

Also known is the use of polylaminate sacks for the transport of large quantities of food products such as cereals, nuts and coffee. These systems have the limitation of adaptation to secure transport, exposing the sacks to accidental breakage during their transport and handling. In fact, these sacks are easily torn even by small impacts with bodies that are not necessarily blunt.

There is therefore the need to simplify the packaging of large quantities of roasted coffee beans in order to avoid both the oxidation of the oils present in the roasted coffee and, at the same time, avoid the formation of an excessive over-pressure inside the container as well as, at the same time, allowing large warehousing capacity in a single container, without resorting to a plurality of small expensive packages of complex construction for the transport of already roasted beans, small packages that are suitable for direct sale to the public, and not for subsequent processing.

There is therefore the need to simplify the packaging of large quantities of roasted and ground coffee beans in order to avoid both the oxidation of the oils present in the roasted coffee and, at the same time, avoid the formation of a depression inside the container as well as, at the same time, allowing large warehousing capacity in a single container, without resorting to a plurality of small expensive packages of complex construction for the transport of already roasted beans, small packages that are suitable for direct sale to the public, and not for subsequent processing, as we wish to allowing doing with this solution.

There is also a strongly felt need to store large quantities of roasted coffee (both in beans and ground) before sending it to various further processing and packaging, so as to have a warehouse of semi-finished product that can respond promptly to a sudden request for subsequent processing phases, avoiding having to wait long times for roasting and, perhaps, even grinding, especially, although not necessarily, where the roasting, grinding and especially of further processing and packaging plants are located in different locations.

Solution

Therefore, the purpose of this invention is to provide a packaging assembly for the storage and/or transport of roasted coffee, as well as a method of filling, storing and transporting said assembly that is able to satisfy the above-listed needs and solve the problems of the prior art.

These and other purposes are achieved by means of an assembly according to claim 1, a method according to claim 8. Several advantageous embodiments are covered by the dependent claims.

Thanks to the embodiments described in the claims, it is possible to provide a packaging assembly of large, suitable also for industrial uses. In particular, the proposed solution allows avoiding the oxidation of the oils present in roasted coffee, allowing storage times up to 90 days and beyond, and thus safeguarding the fragrance, aromas and flavours of freshly roasted coffee. At the same time, there is excellent moisture resistance.

Thanks to the proposed solutions, it is also possible to avoid the formation of excessive over-pressures in the assembly even if there are large quantities of roasted coffee in a single volume that releases large quantities of gas.

Thanks to the suggested embodiments, it is possible to protect the assembly from accidental breakage, facilitating and, above all, simplifying the handling of the packaging during loading, unloading and storage.

In particular, thanks to the embodiments described, it is possible to facilitate and especially to simplify the operations of loading roasted coffee and unloading it at the destination in the processing plants, perhaps thousands of kilometres away, and after several tens of days. Furthermore, the embodiments described allow for a simple check of the proper state of the coffee even after its packaging or even shortly before its unloading to determine in time whether to mix the contents of one assembly with others.

Thanks to the embodiments described, it is possible to obtain an assembly with high structural stability suitable for the transport and/or storage of a large, heavy assembly.

FIGURES

Further characteristics and advantages of the assembly according to the invention will appear in the following description of its preferred embodiments, provided by way of non-limiting example, with reference to the annexed figures, in which.

Figure 1:
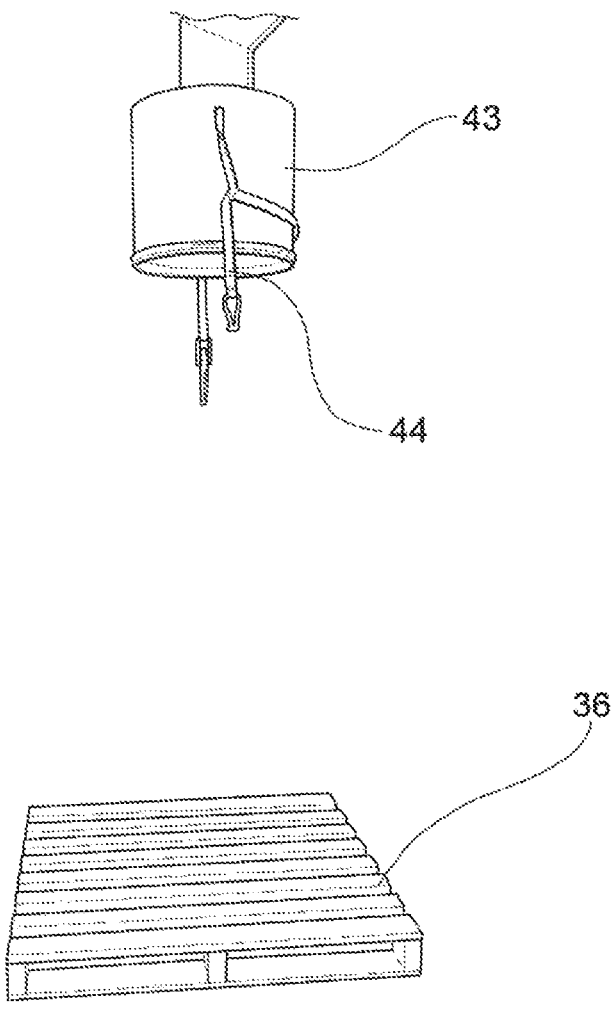
FIG. 1 is an axonometric view of a transport pallet placed below a hopper for loading coffee beans to which is bound a locking strap of an impermeable bag.
Figure 2:
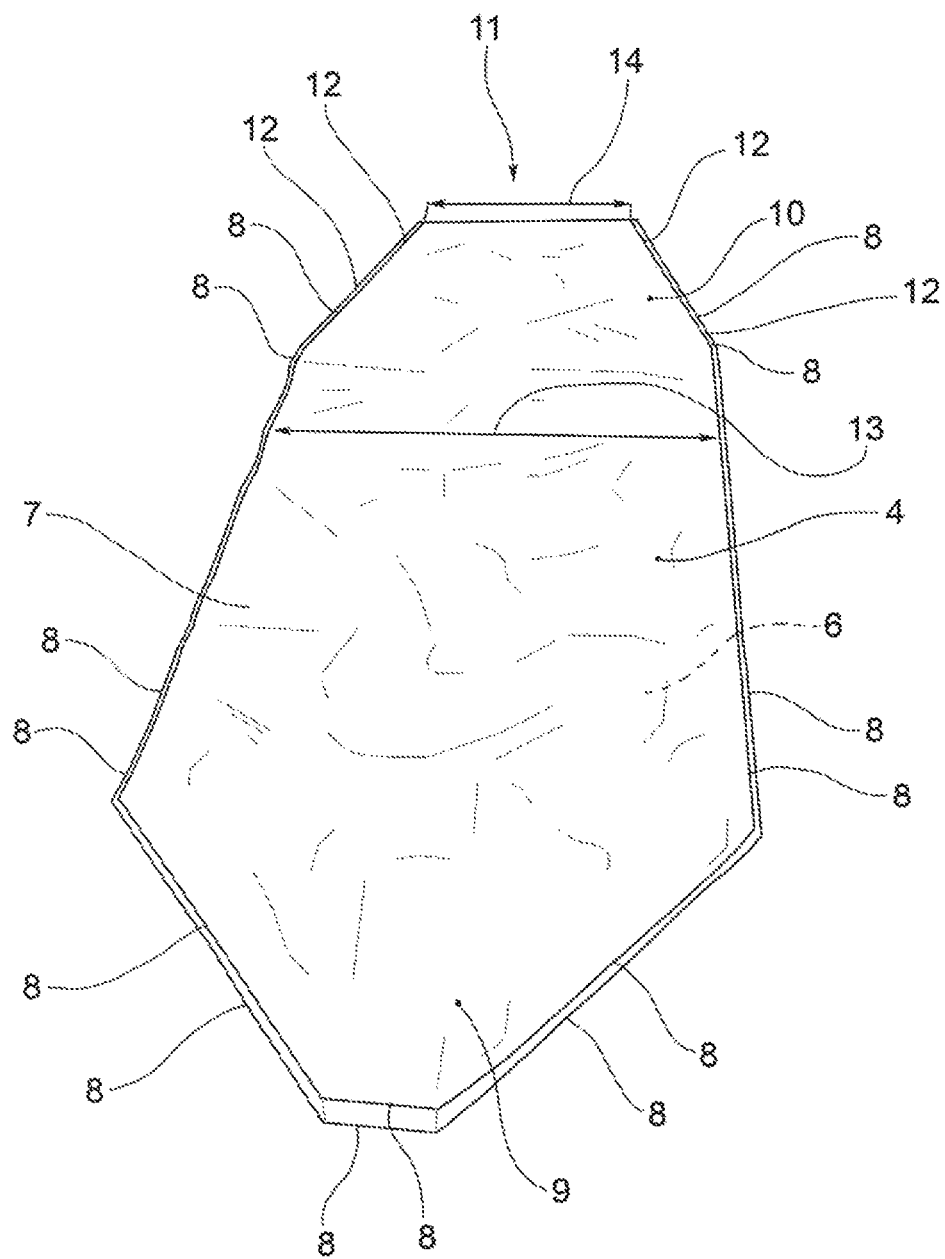
FIG. 2 shows an axonometric view of a die-cut impermeable bag in a position in which the die-cut flaps are folded in a flat position, from which you can see the shape of the conical mouth portion with linear trend walls.
Figure 3:
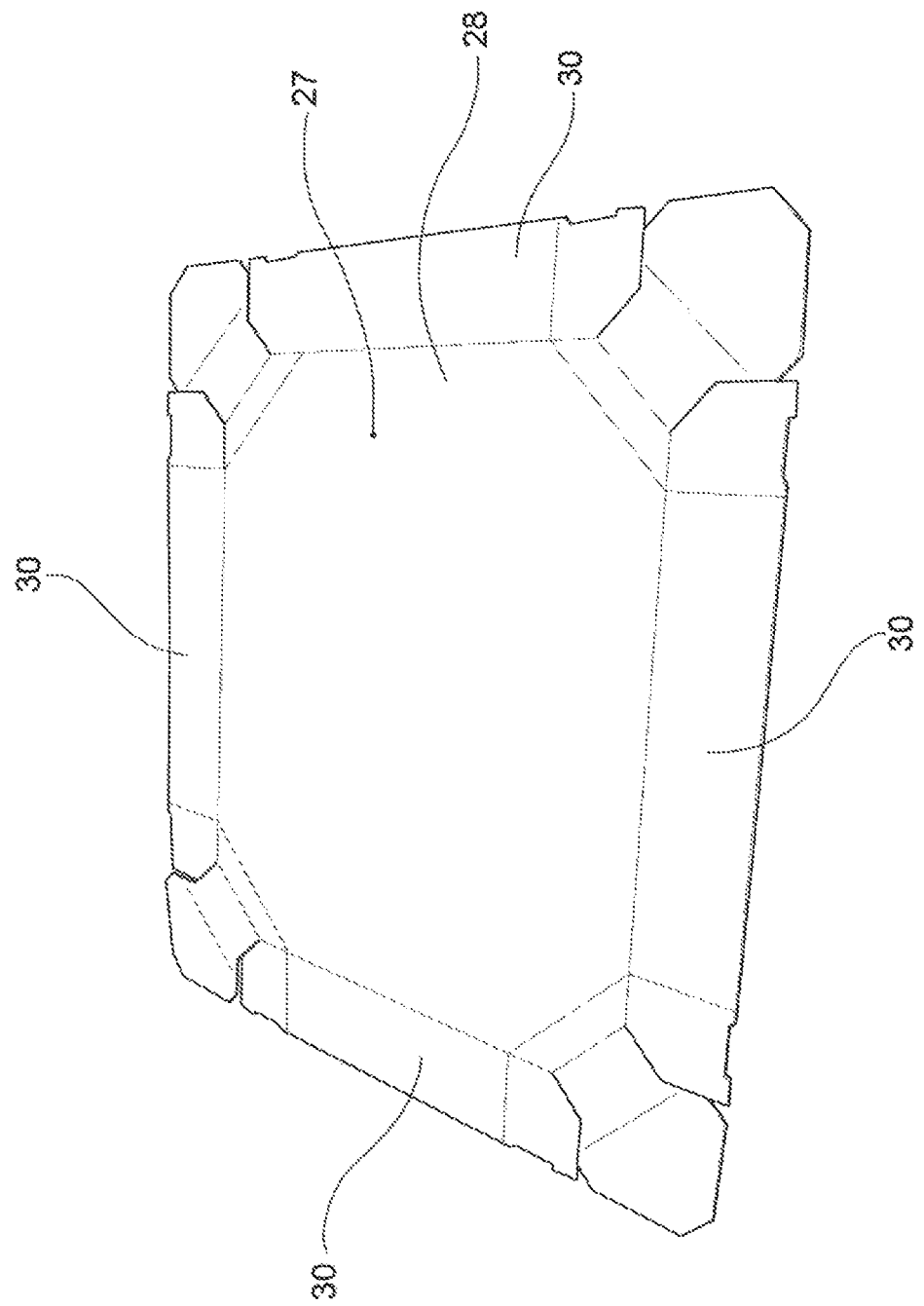
FIG. 3 shows a perspective view of the bottom of a self-supporting, octabin type, container, die-cut and opened in a flat extended position.
Figure 4:
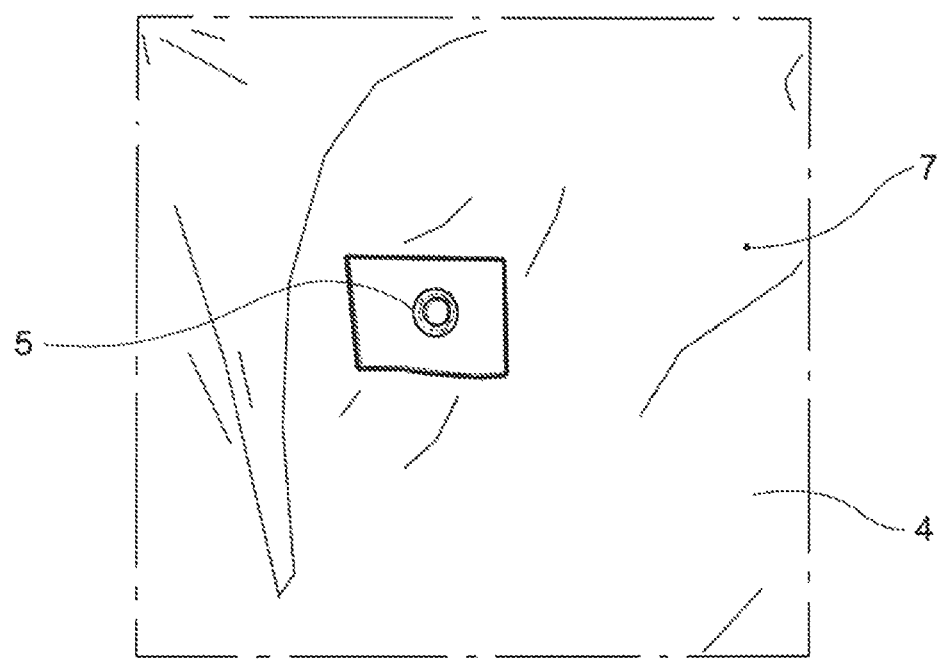
FIG. 4 is a perspective view of a detail of the side wall portion of impermeable bag impermeable to which is associated a unidirectional valve that allows the escape of gas from the inner volume of the impermeable bag, preventing the entry of pollutants and outside air inside the impermeable bag.
Figure 5:
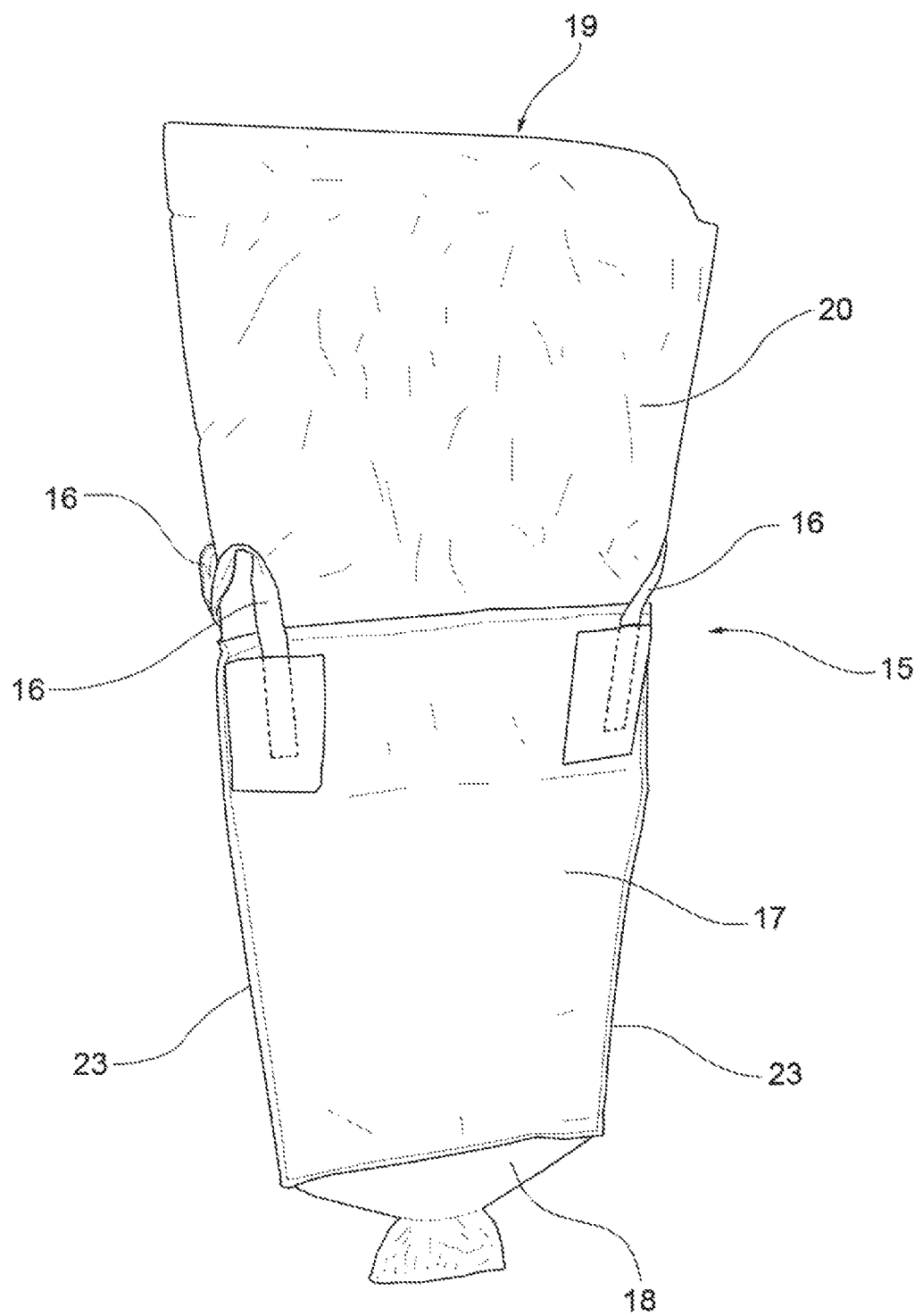
FIG. 5 is a perspective view of a flexible protection and transport sack suitable to be fitted on an impermeable bag with die-cut structure, here in the collection position and lying on a plane.
Figure 6:
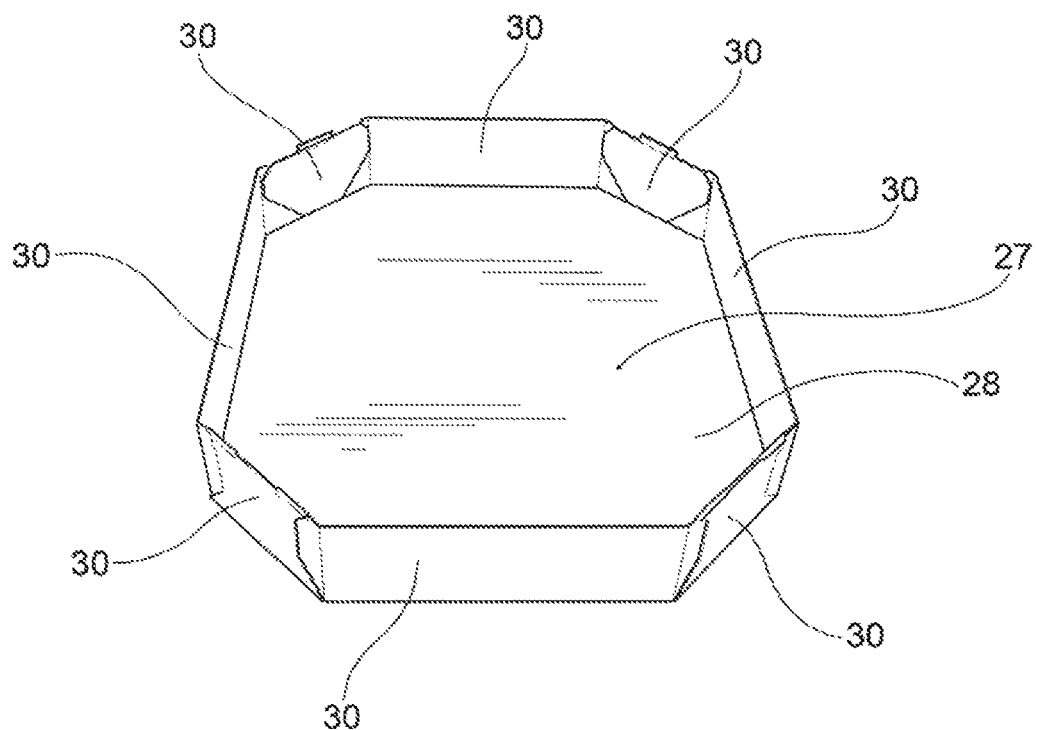
FIG. 6 shows a perspective view of the bottom of a self-supporting, octabin type, container, die-cut and folded to form a bottom with containment edge for lateral walls.
Figure 7:
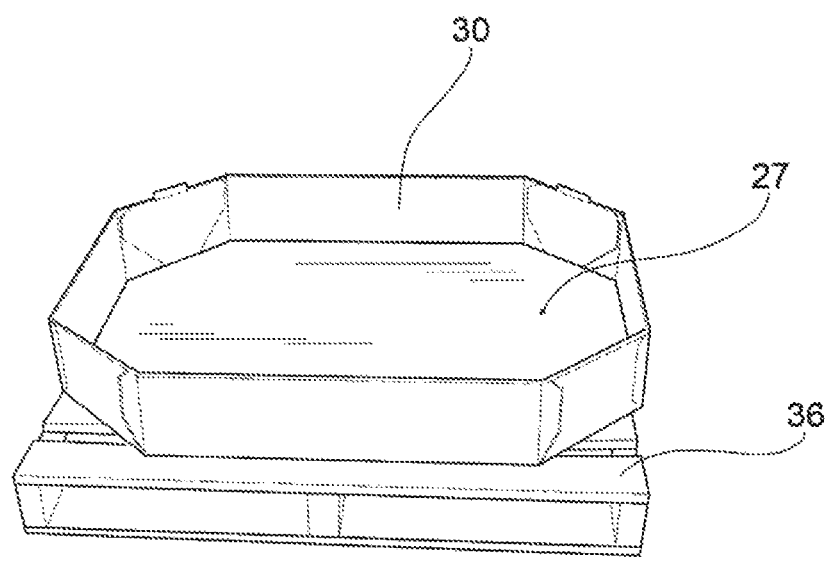
FIG. 7 is a perspective view of the bottom of a self-supporting container of FIG. 6 placed on a transport pallet.
Figure 8:
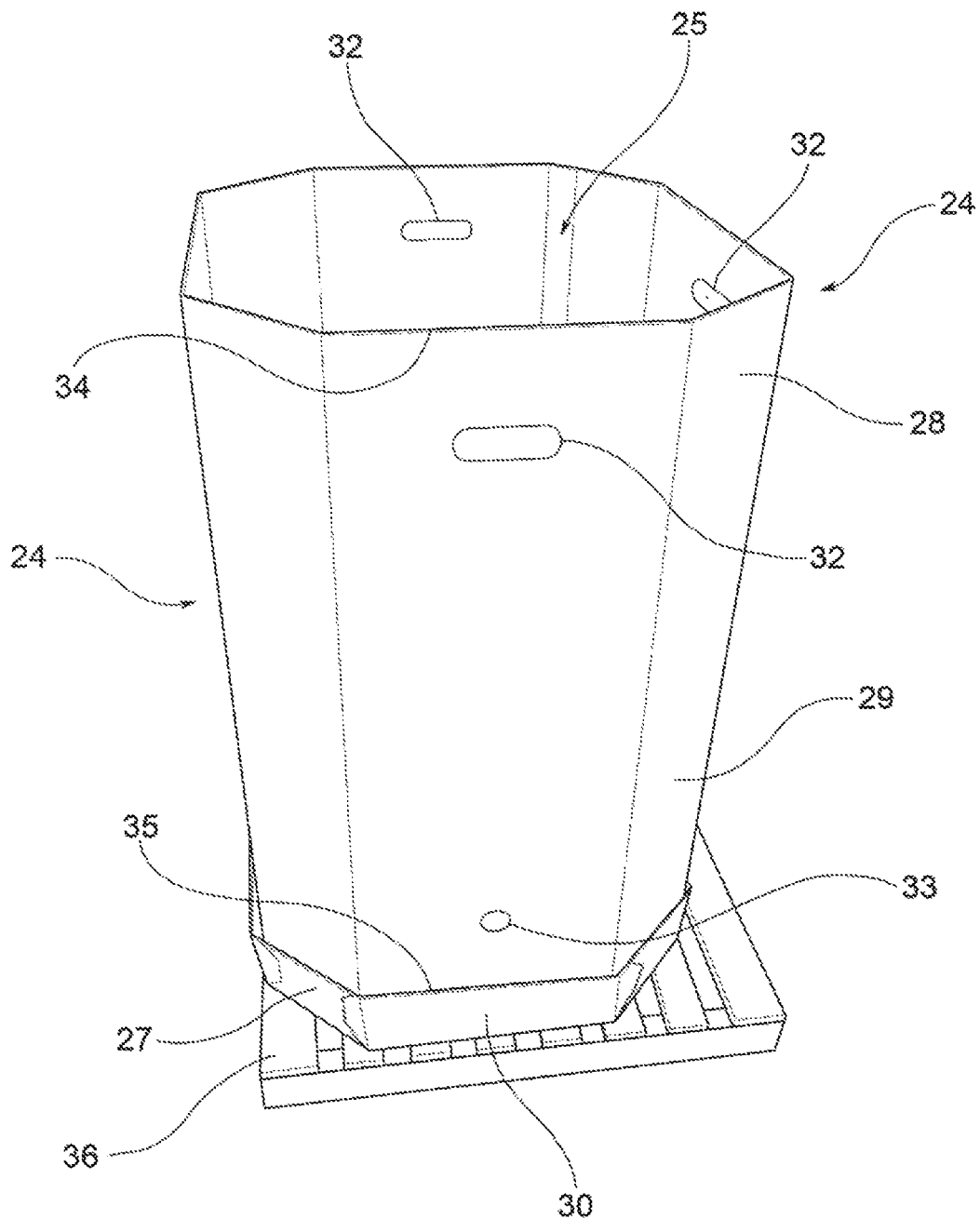
FIG. 8 shows in perspective view the bottom of a self-supporting container of FIG. 6 placed on a transport pallet and in which is fitted the wall of an octabin type self-supporting container, where the lower edge of the wall is fitted inside the folded and lifted edge of the bottom.
Figure 9:
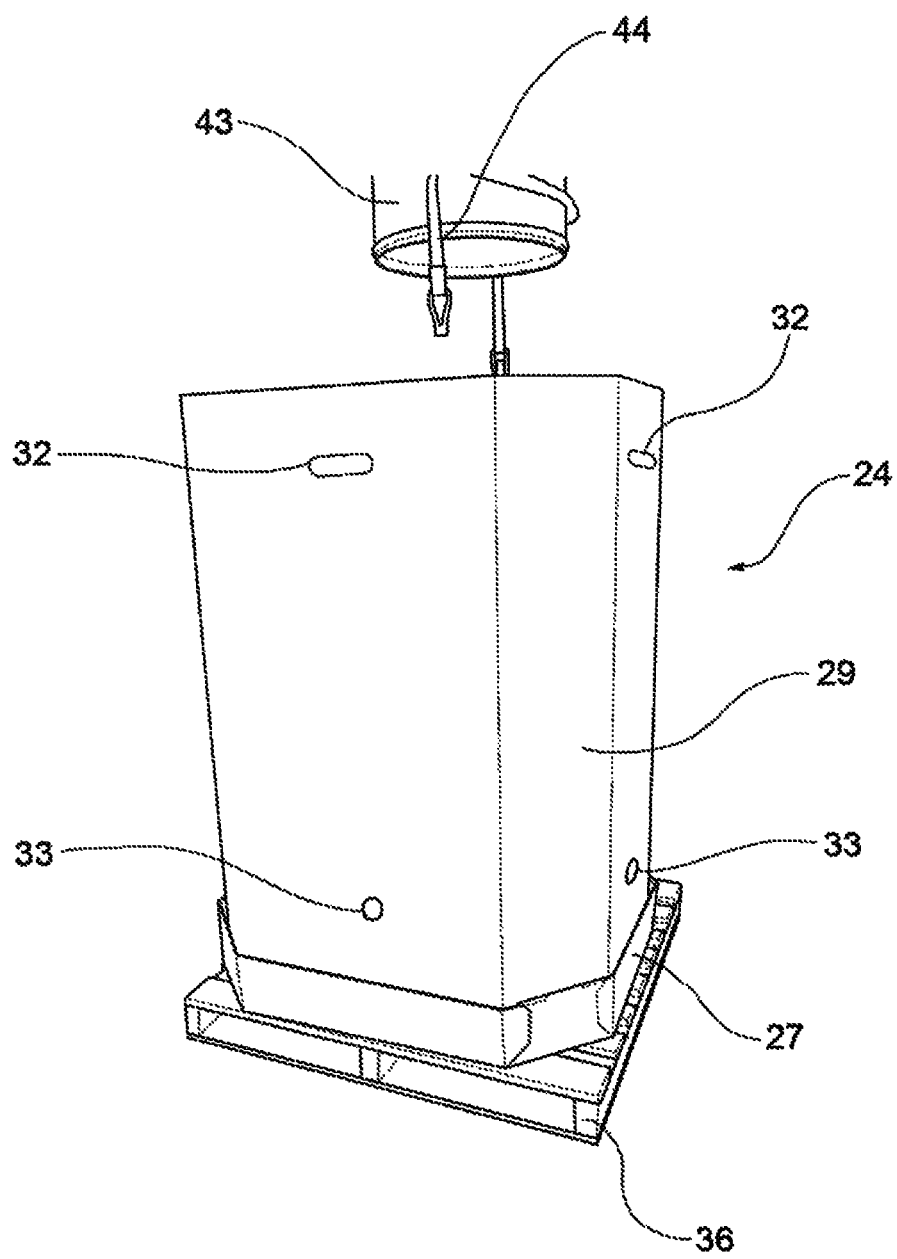
FIG. 9 is a perspective view of the assembly of FIG. 8 placed below a loading hopper of roasted coffee beans.
Figure 10:
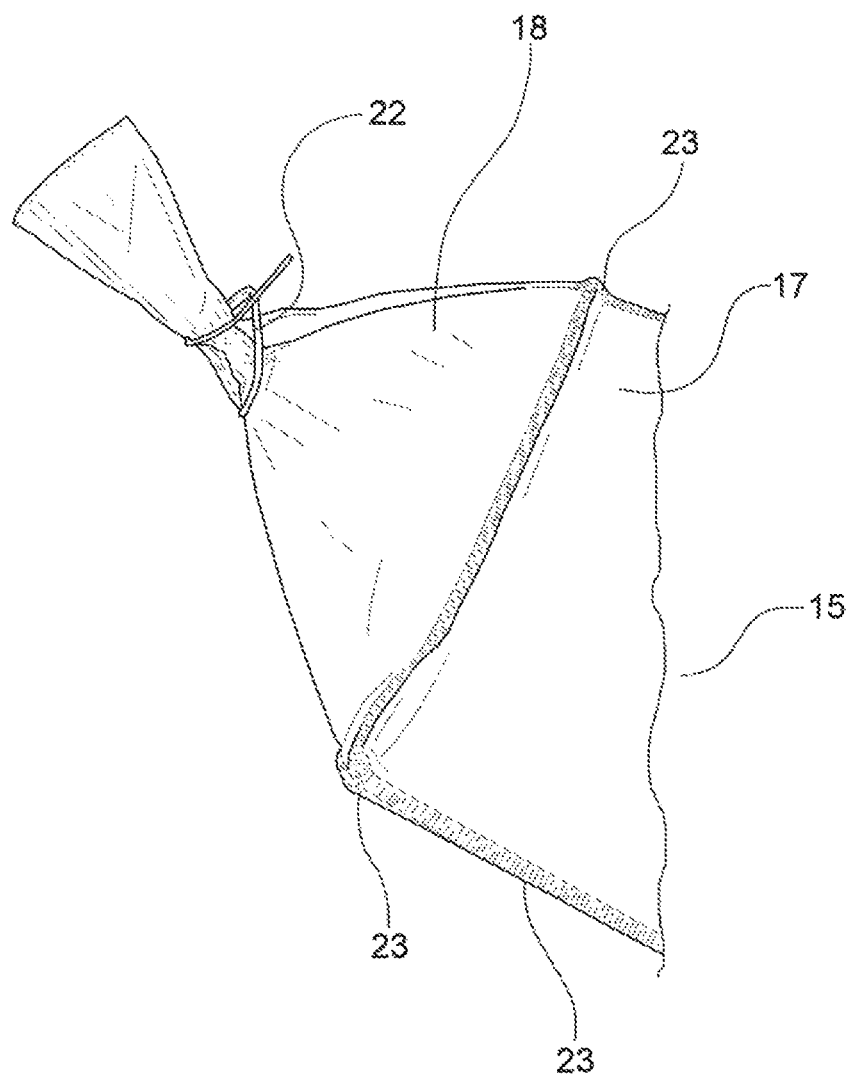
FIG. 10 shows a perspective view of a protection and transport sack in which the bottom is closed with a strap releasable when one wants to unload the contents of the sack.
Figure 11:
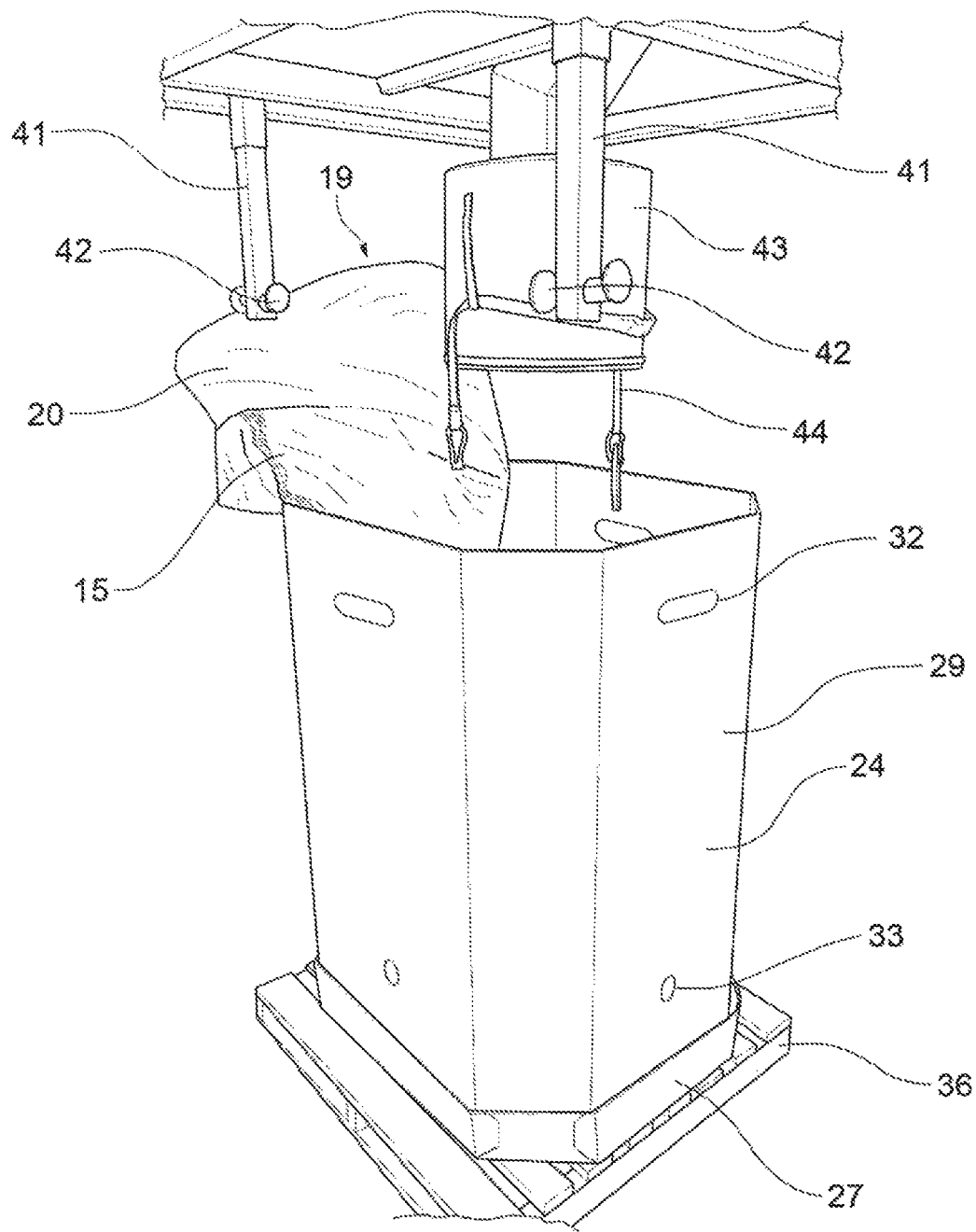
Figure 12:
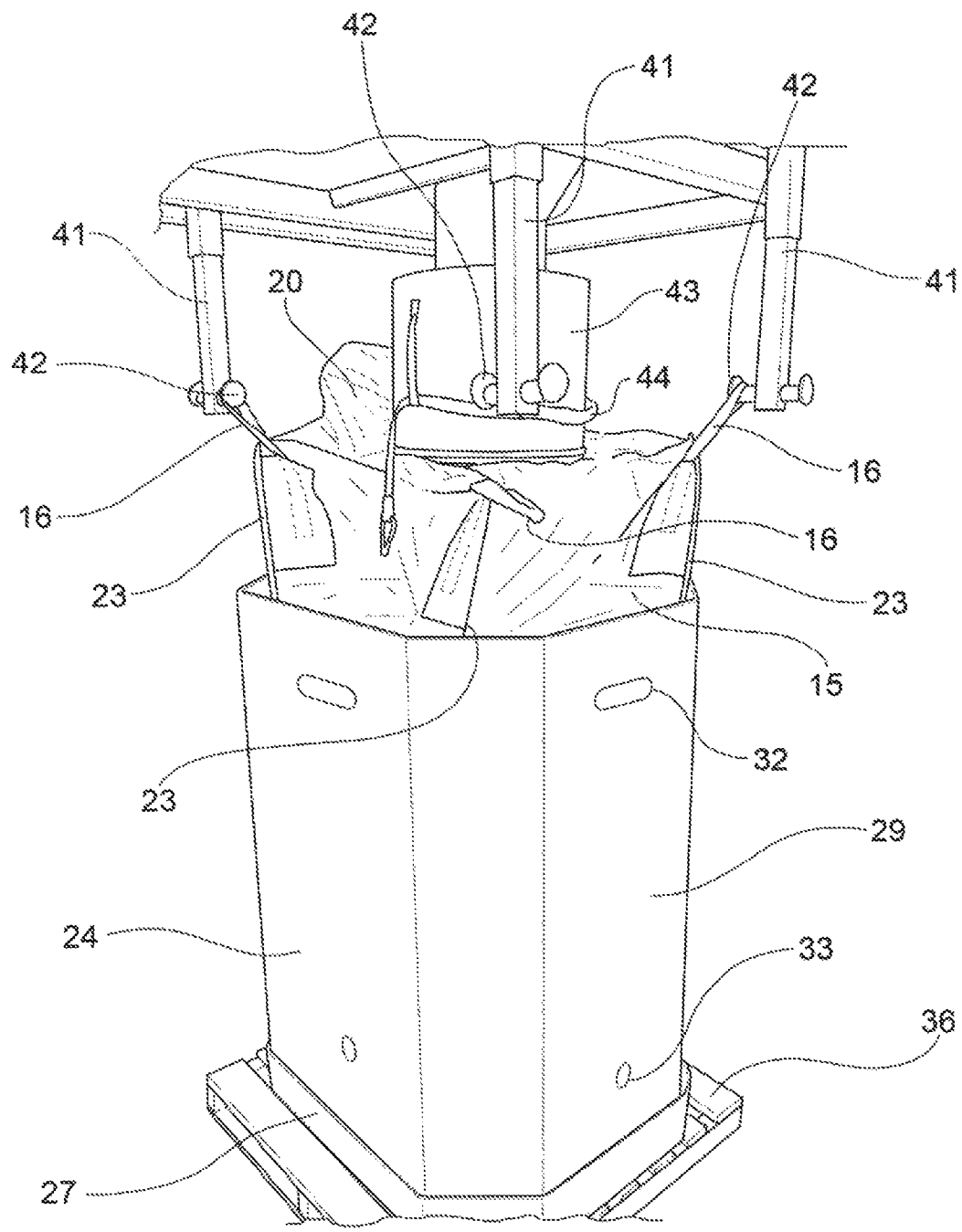
Figure 13:
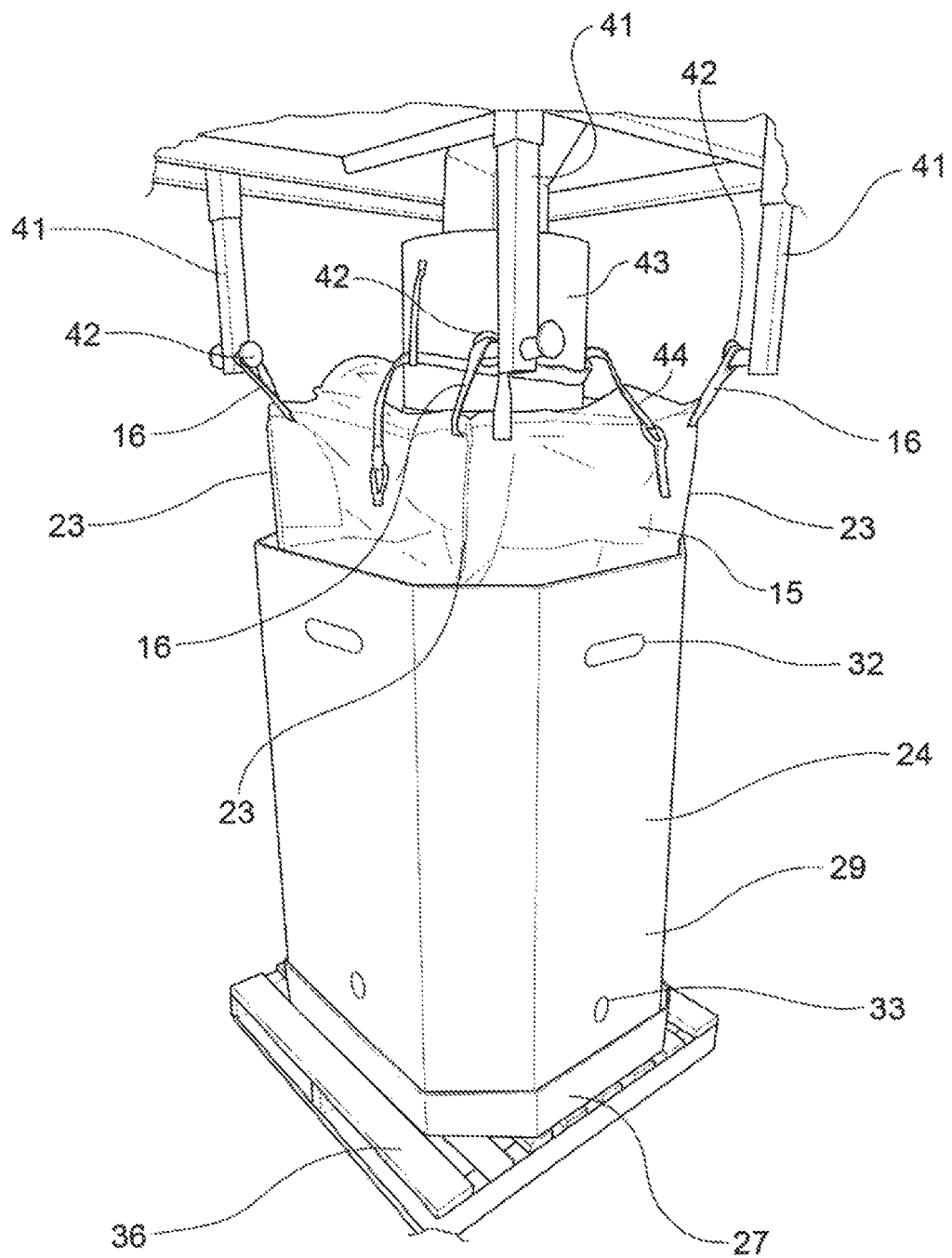
Figure 14:
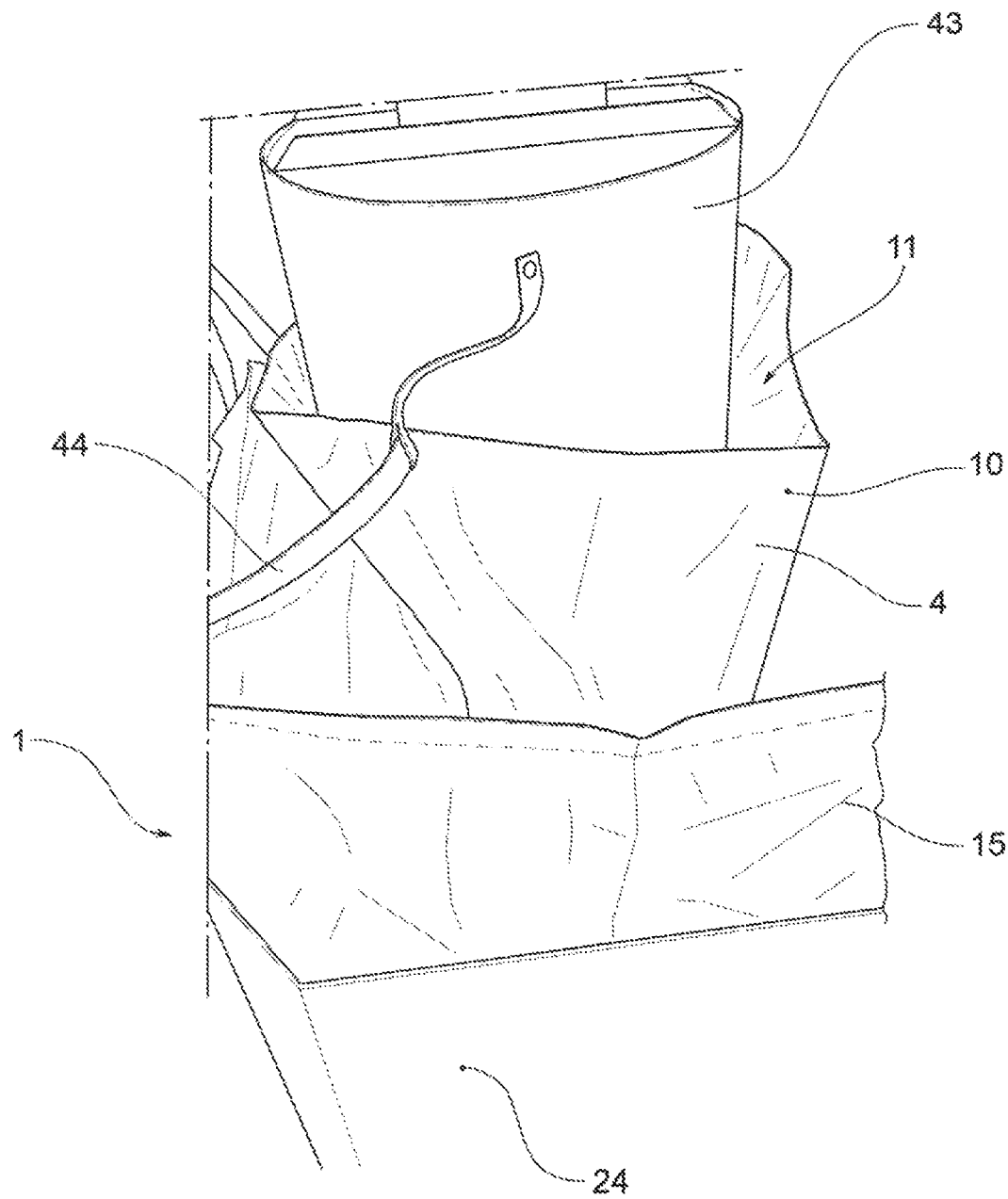
Figure 15:
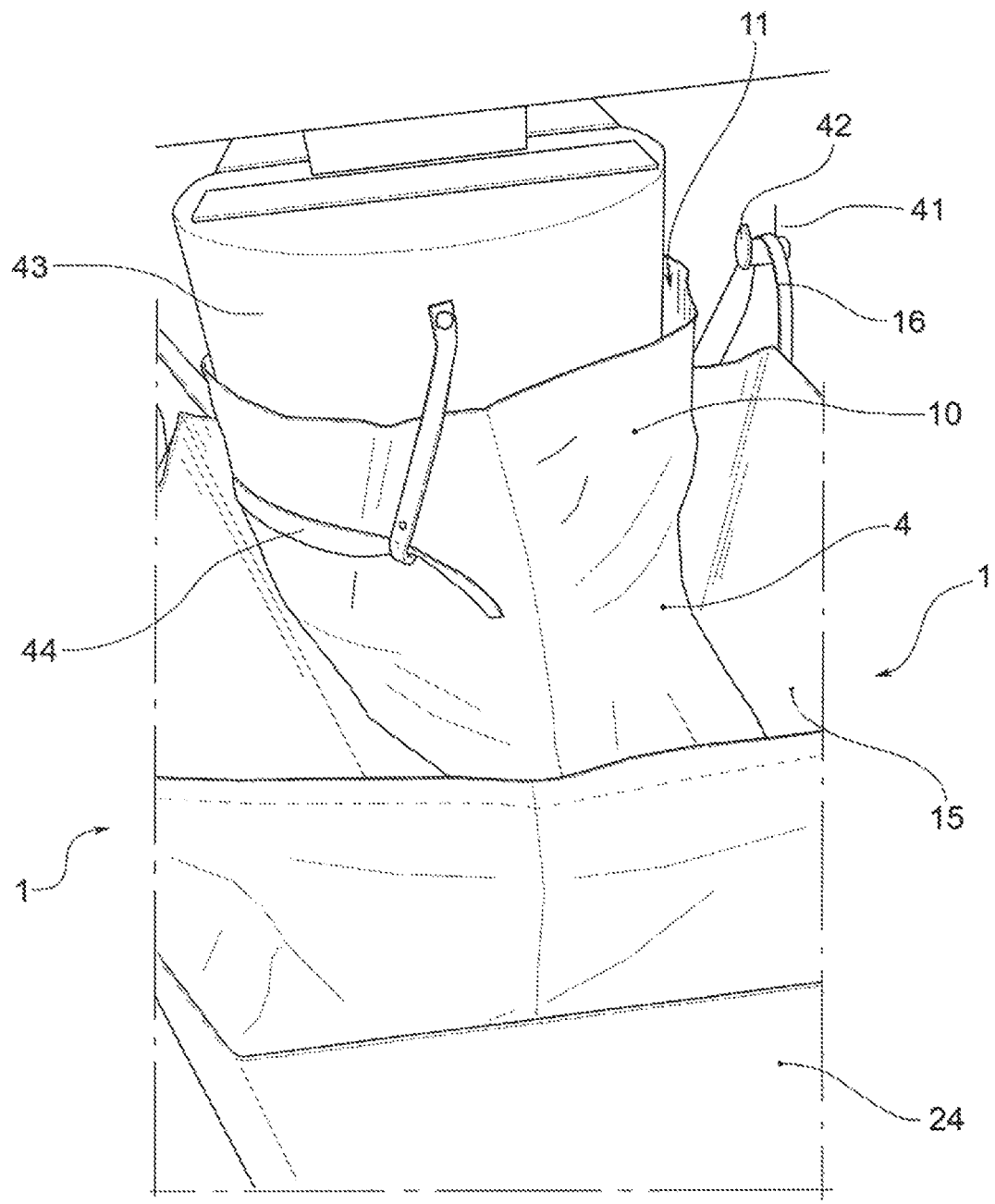
Figure 16:
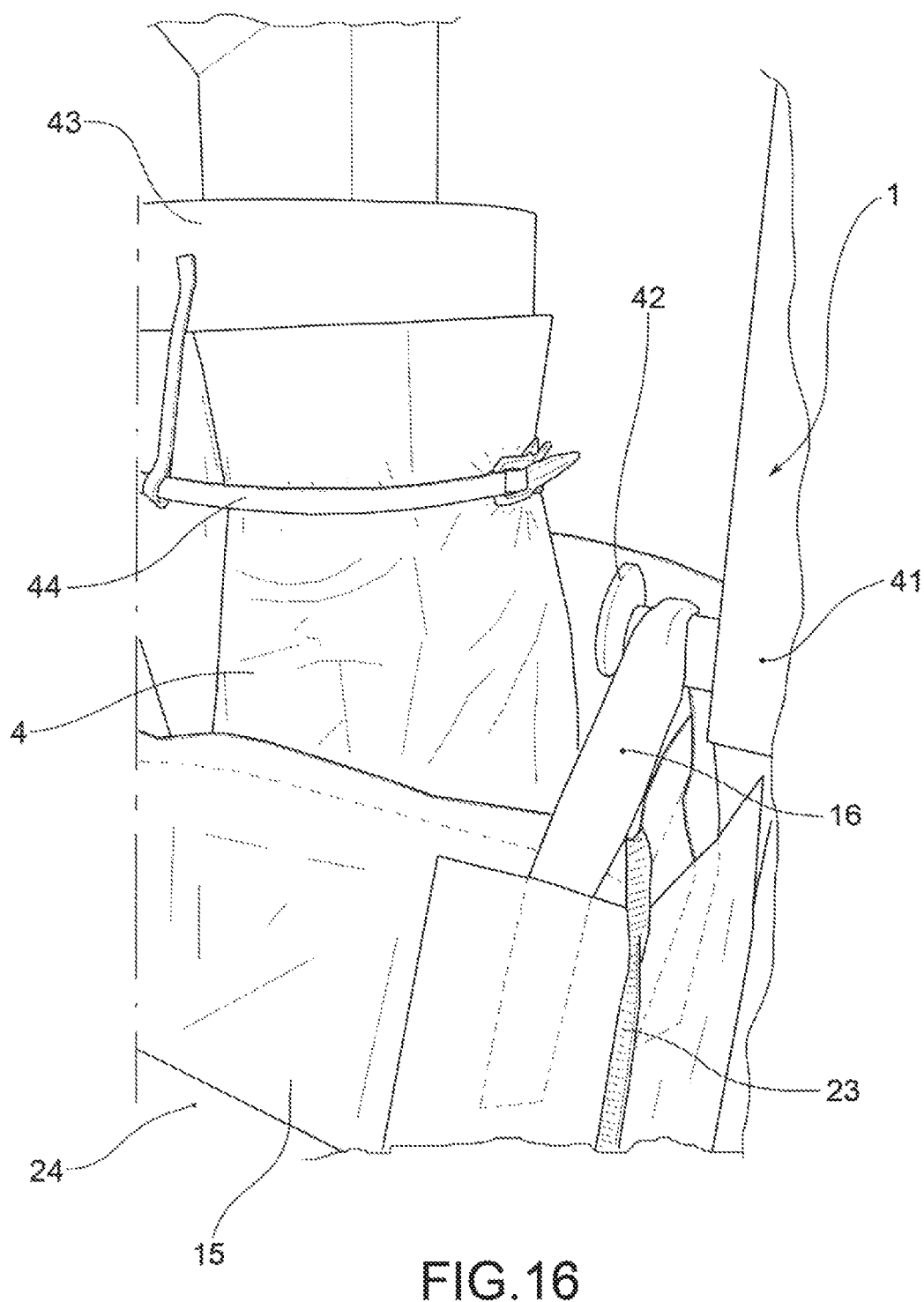
Figure 17:
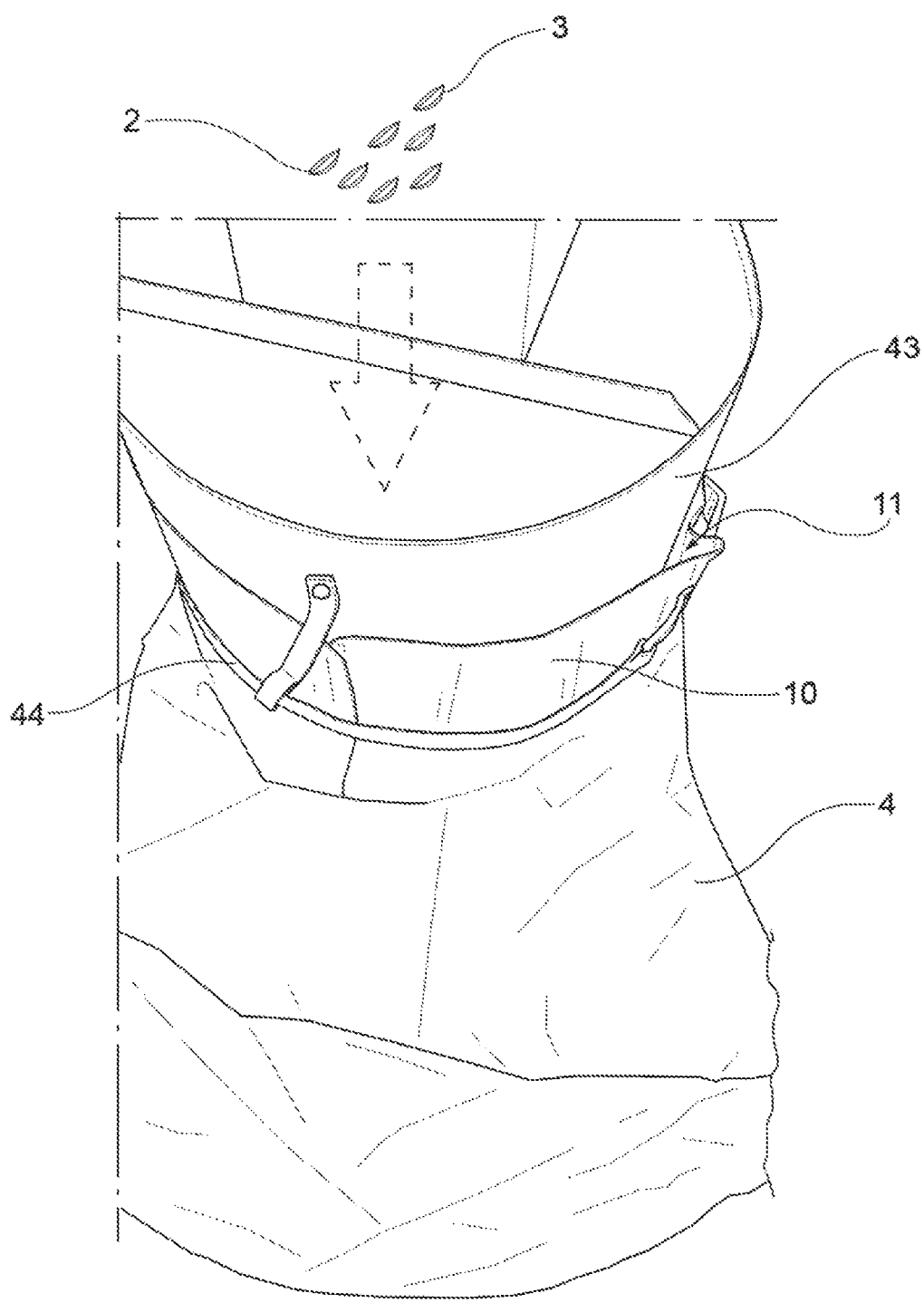
Figure 18:
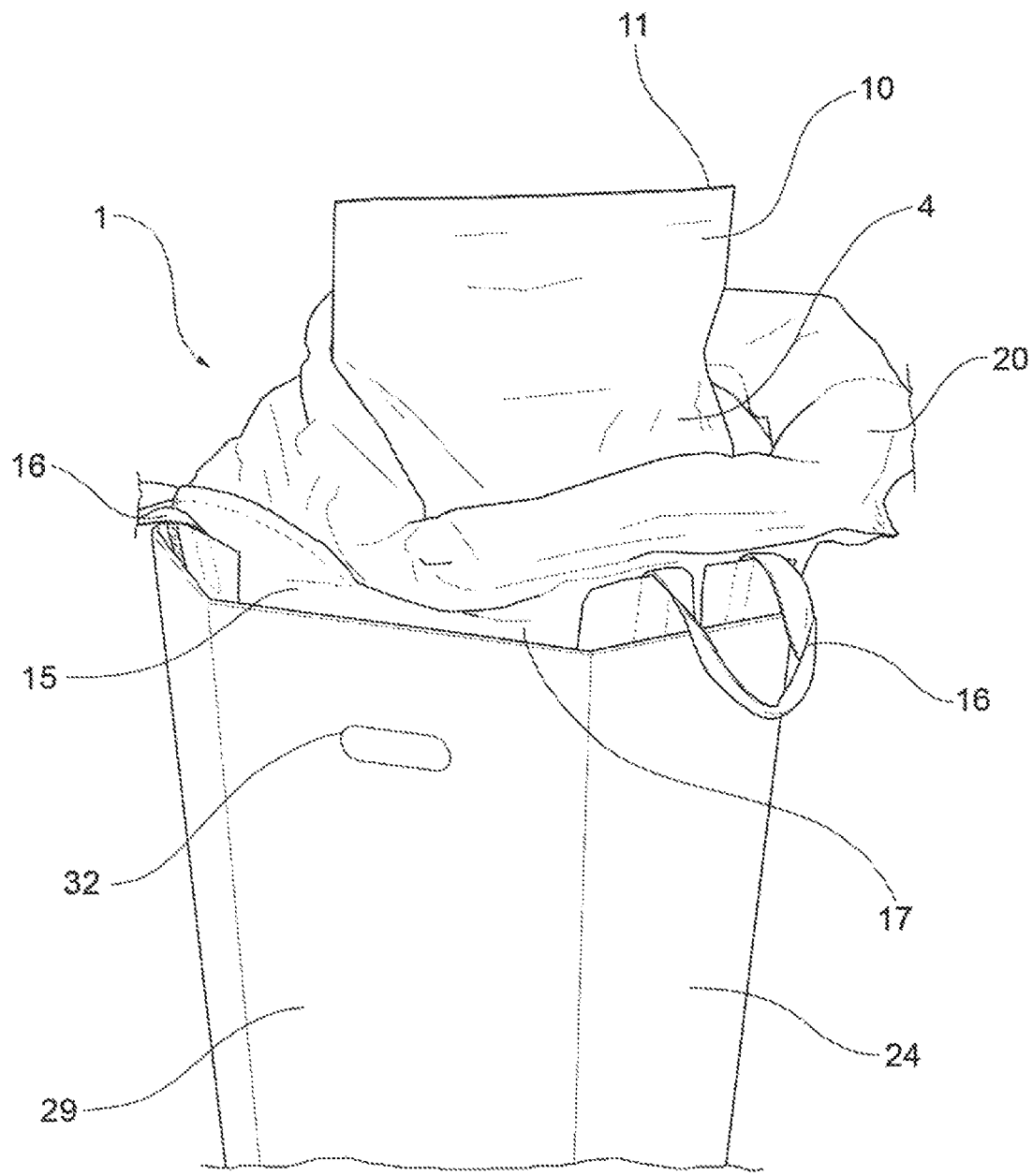
Figure 19:
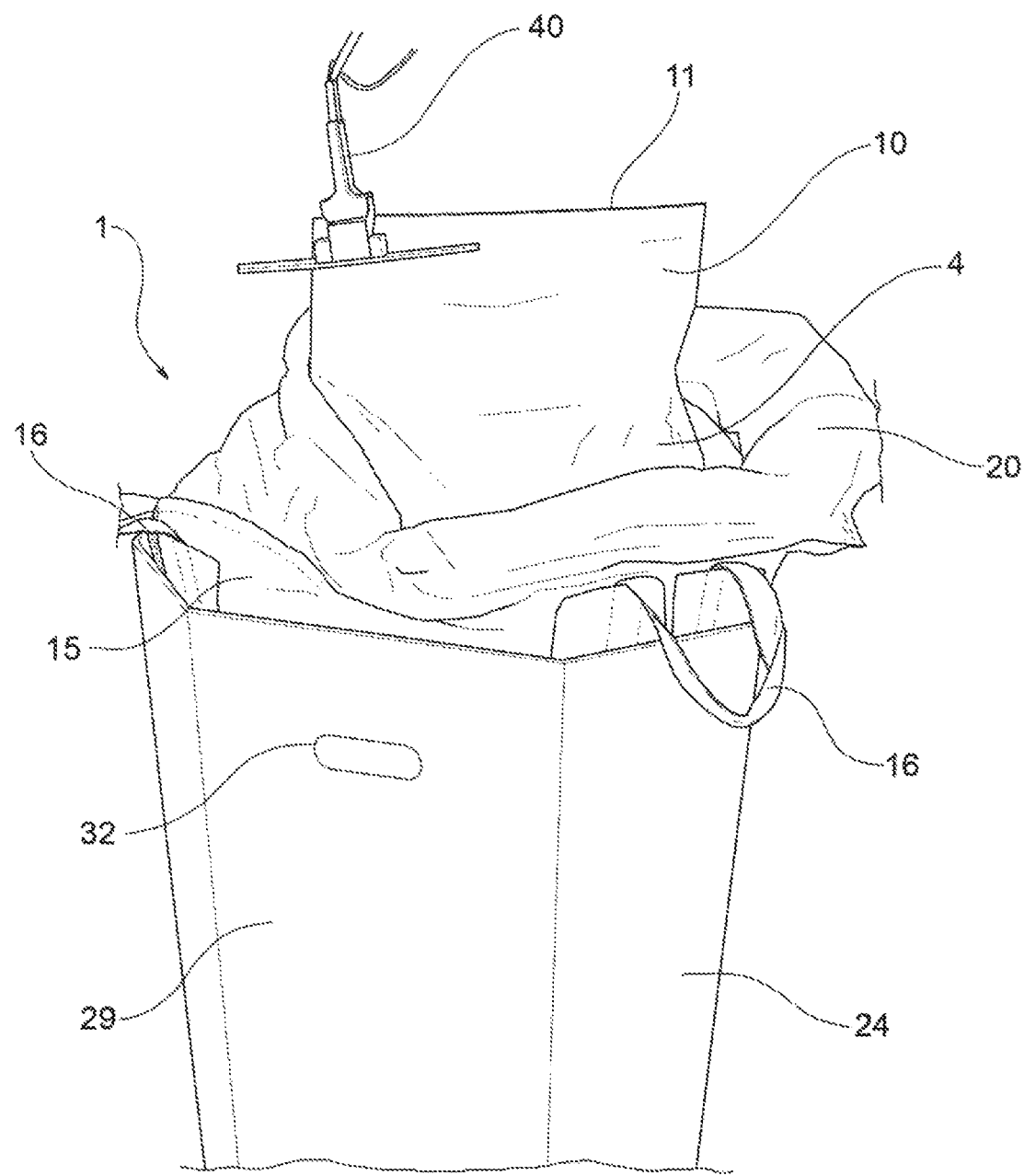
Figure 20:
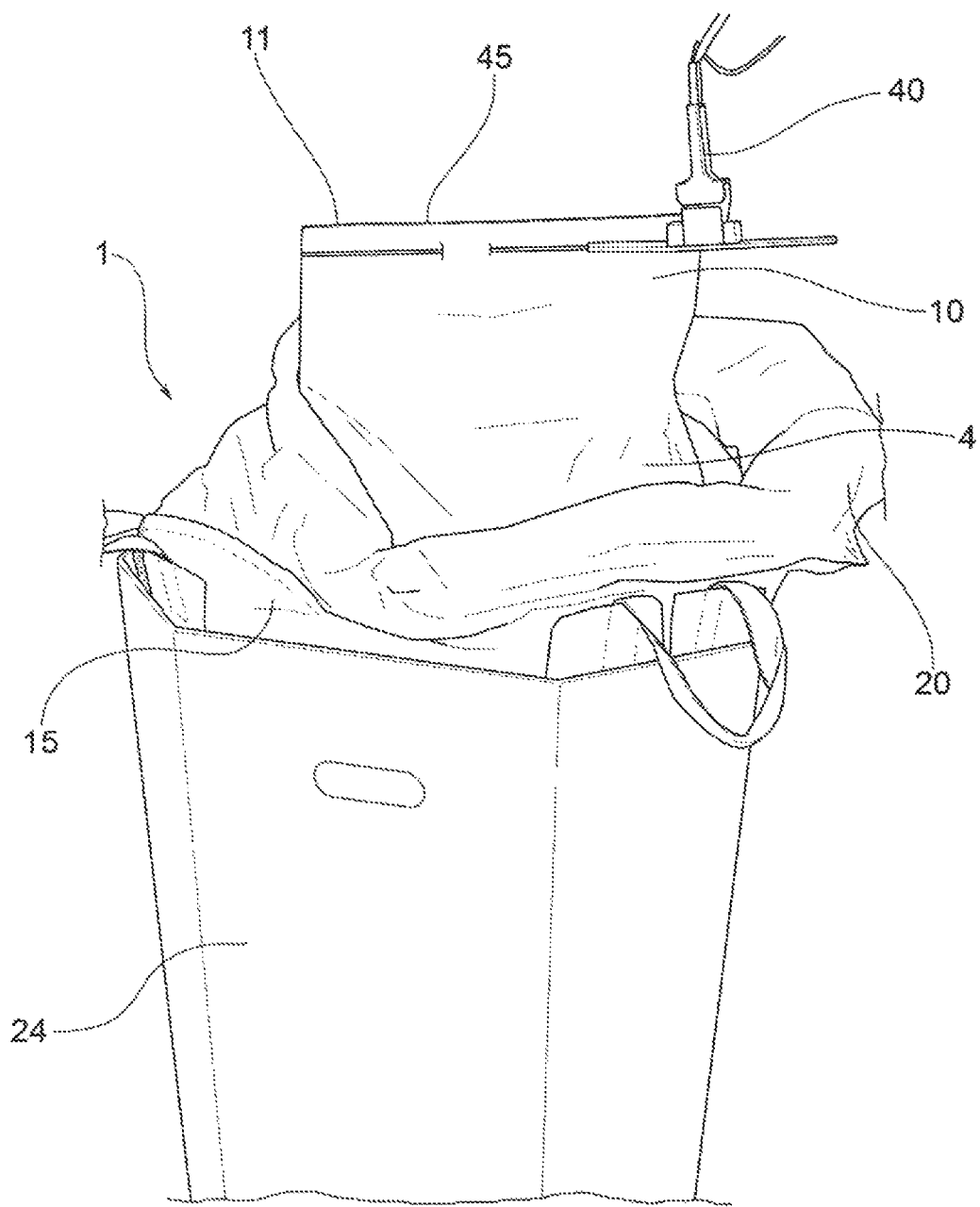
Figure 21:
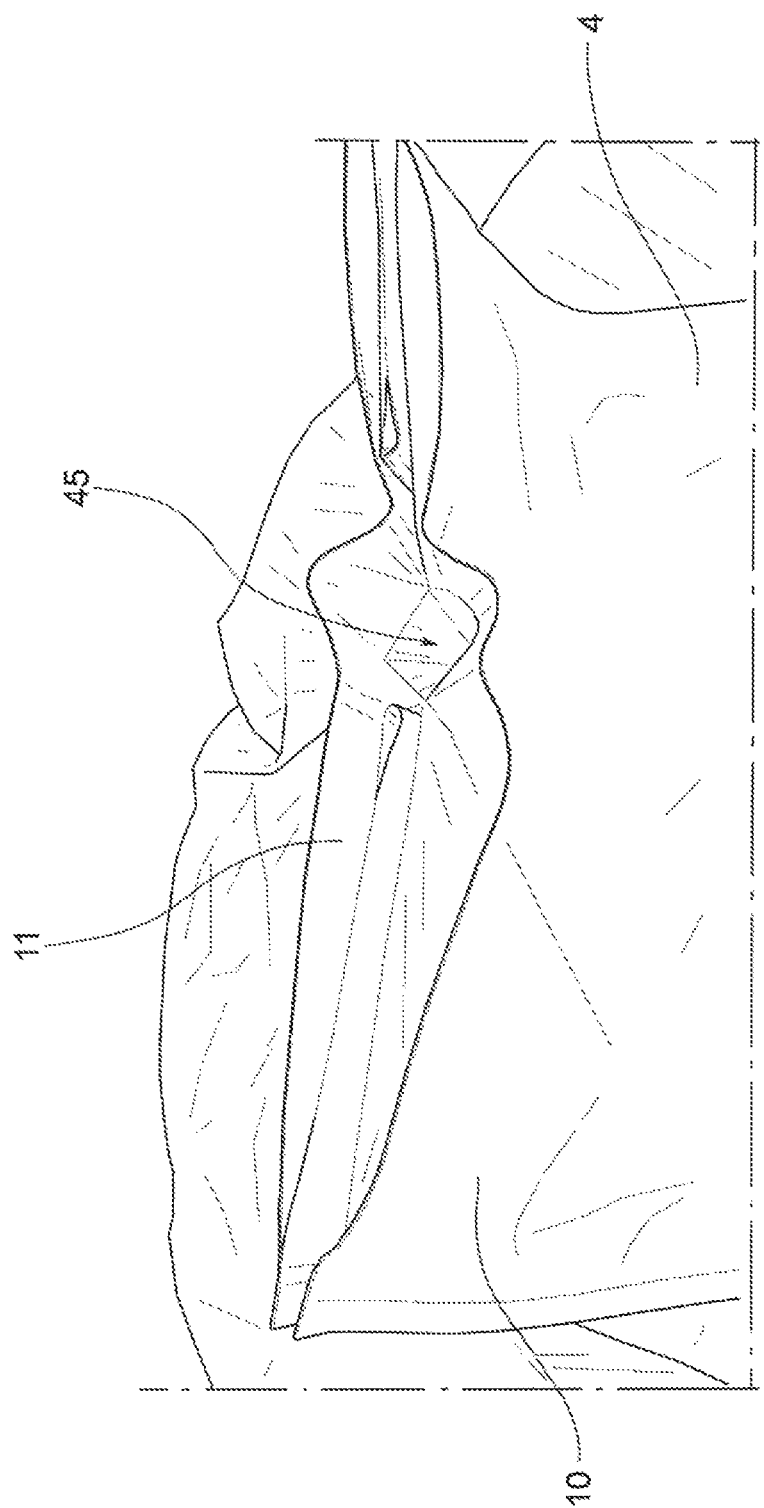
Figure 22:
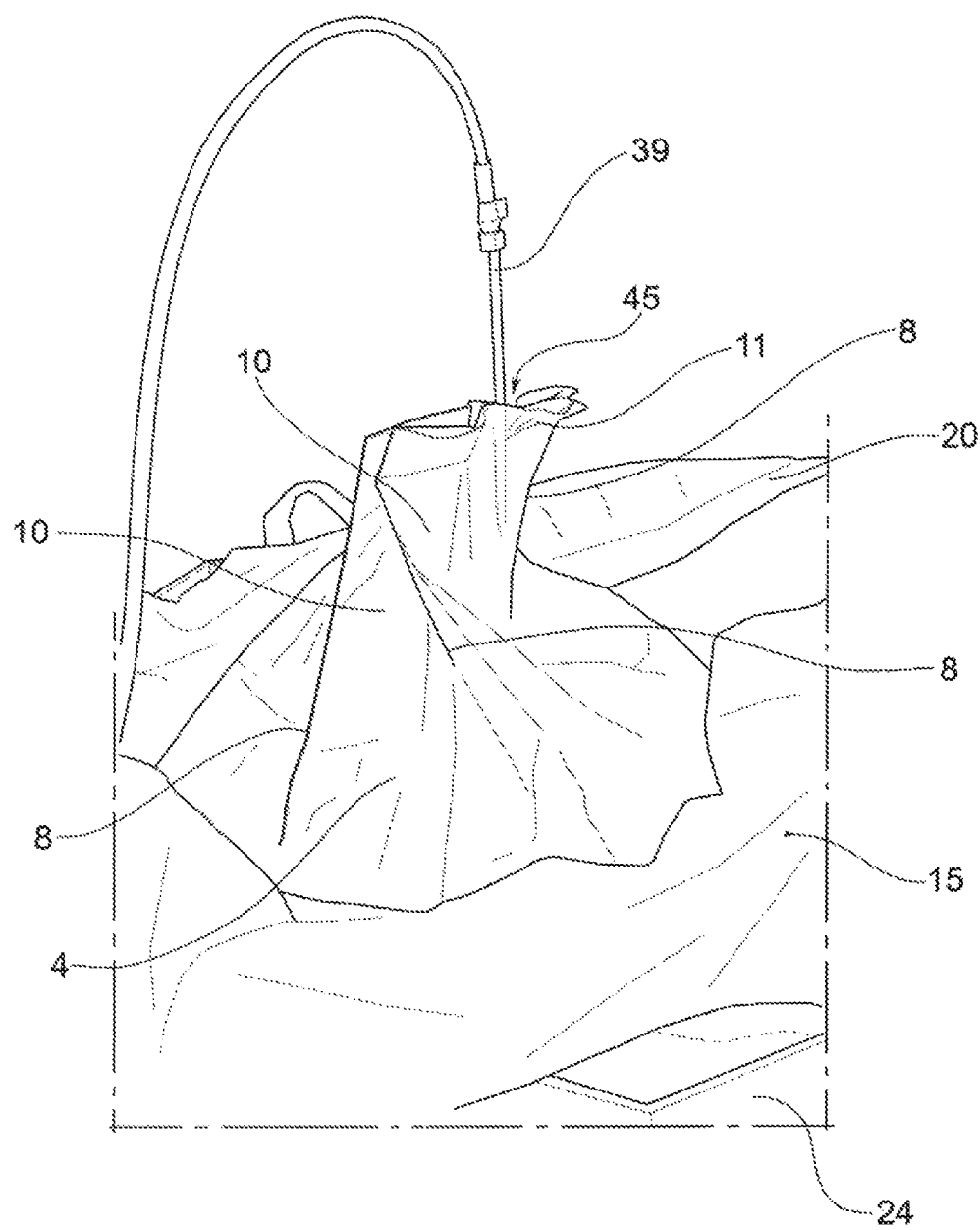
Figure 23:
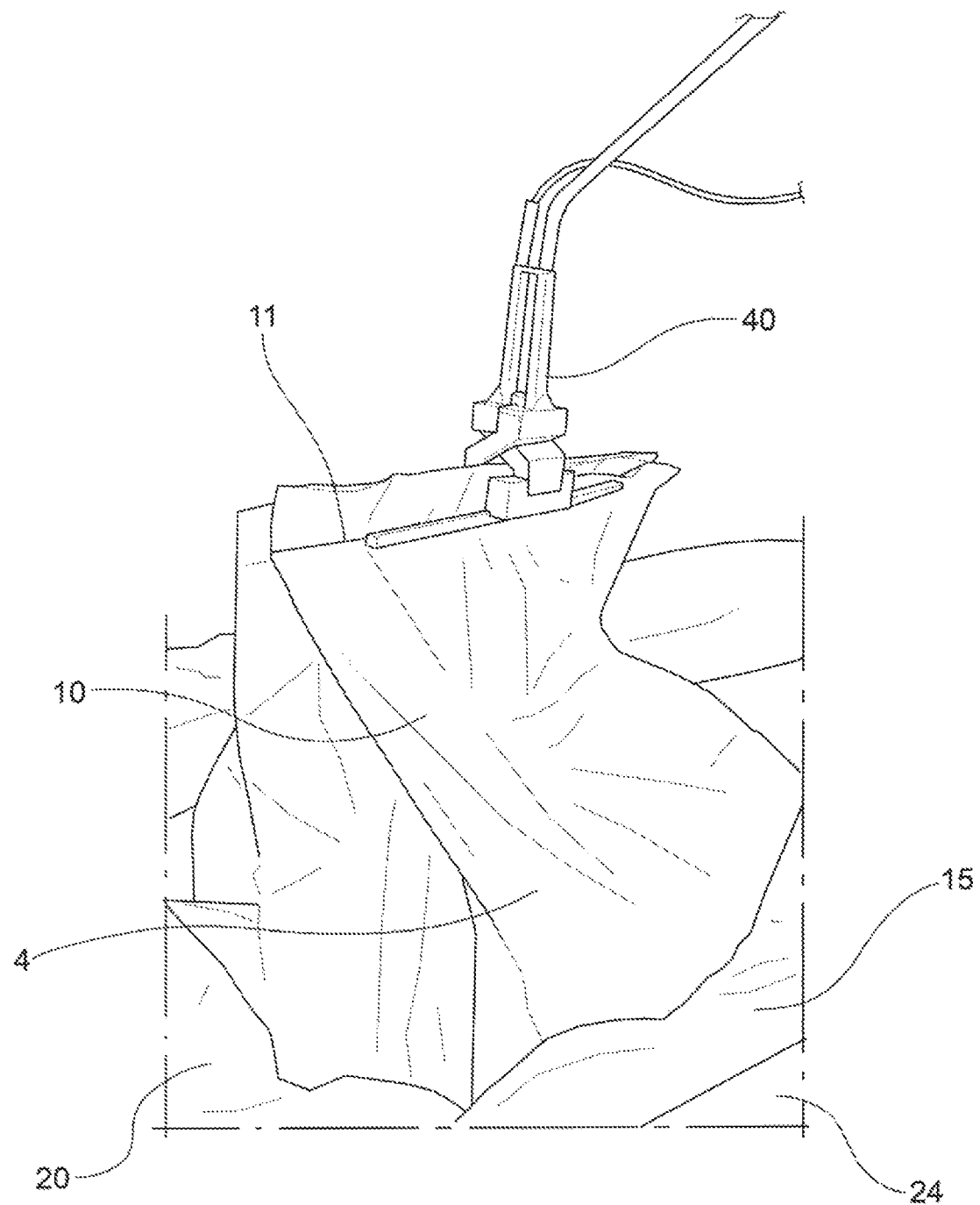
Figure 24:
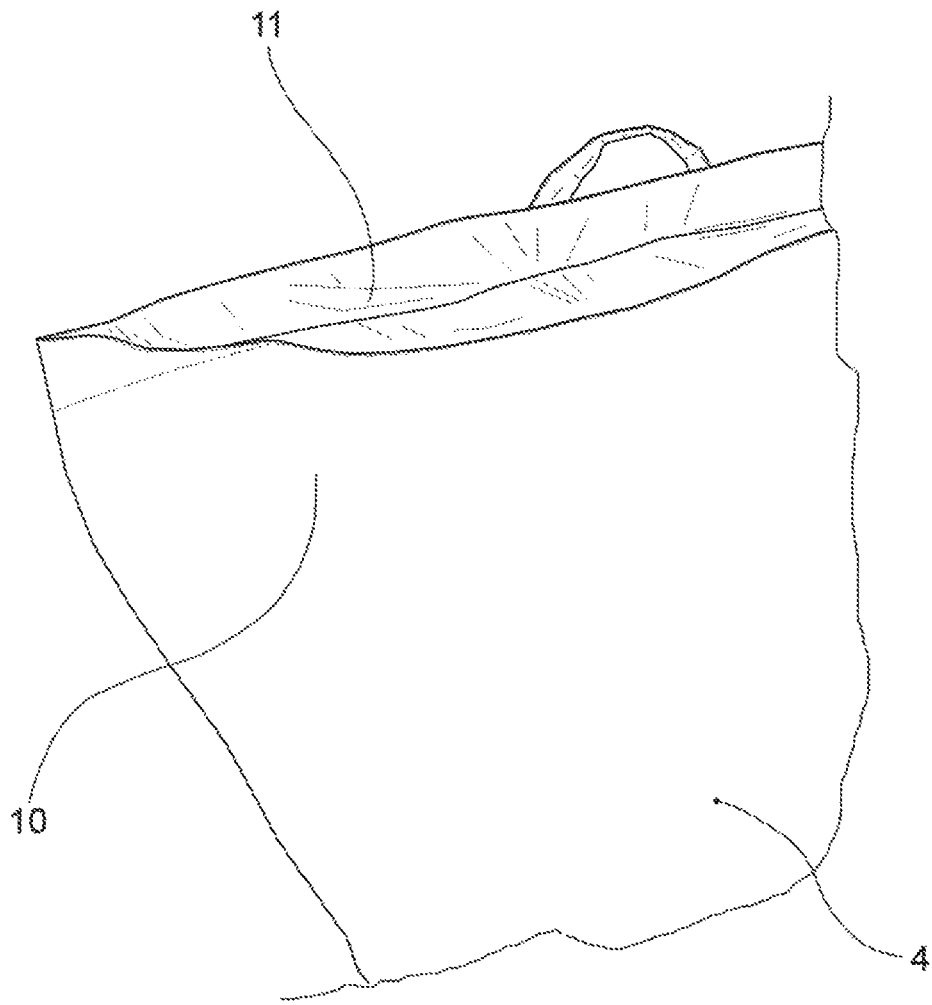
Figure 25:
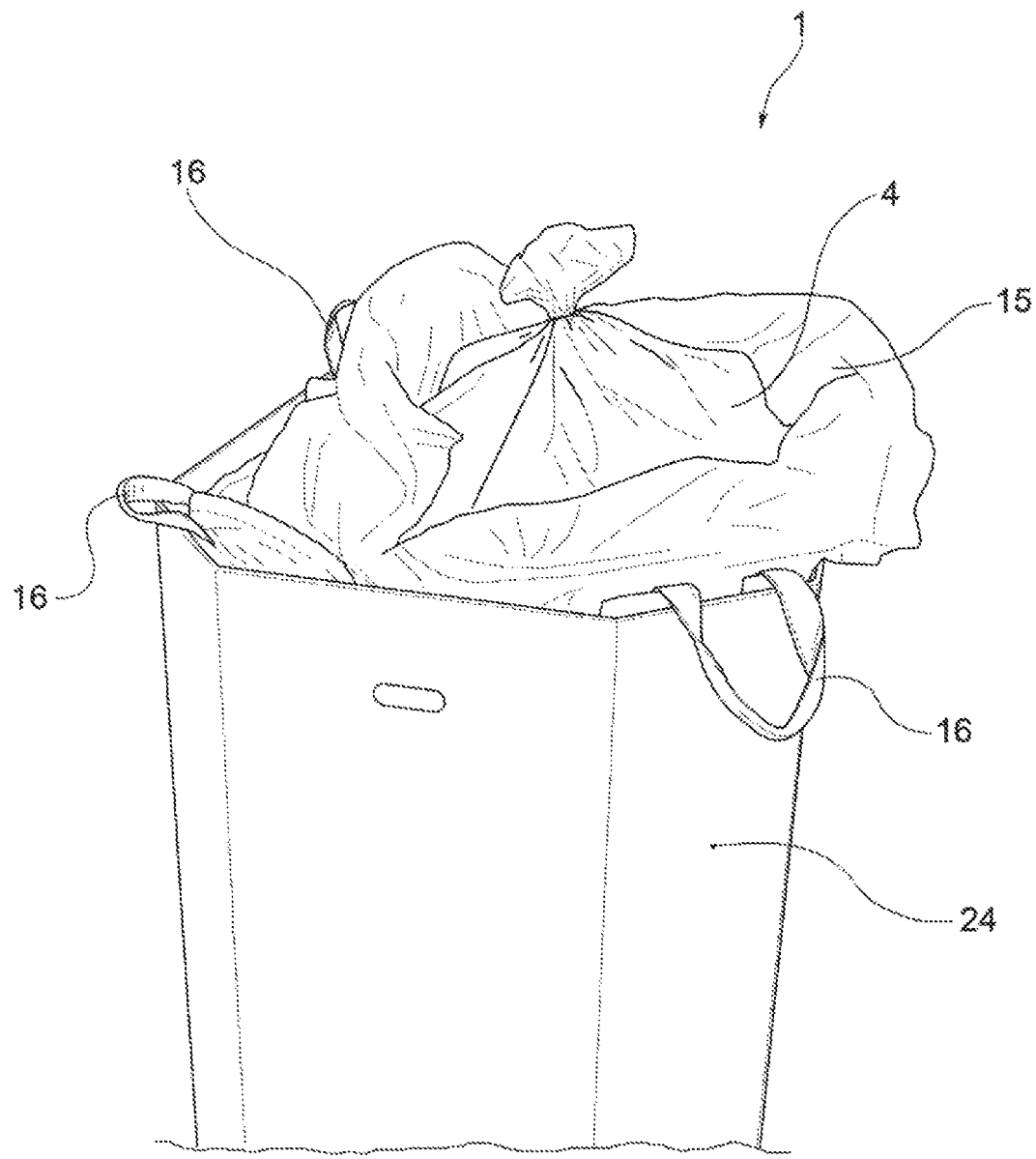
Figure 26:
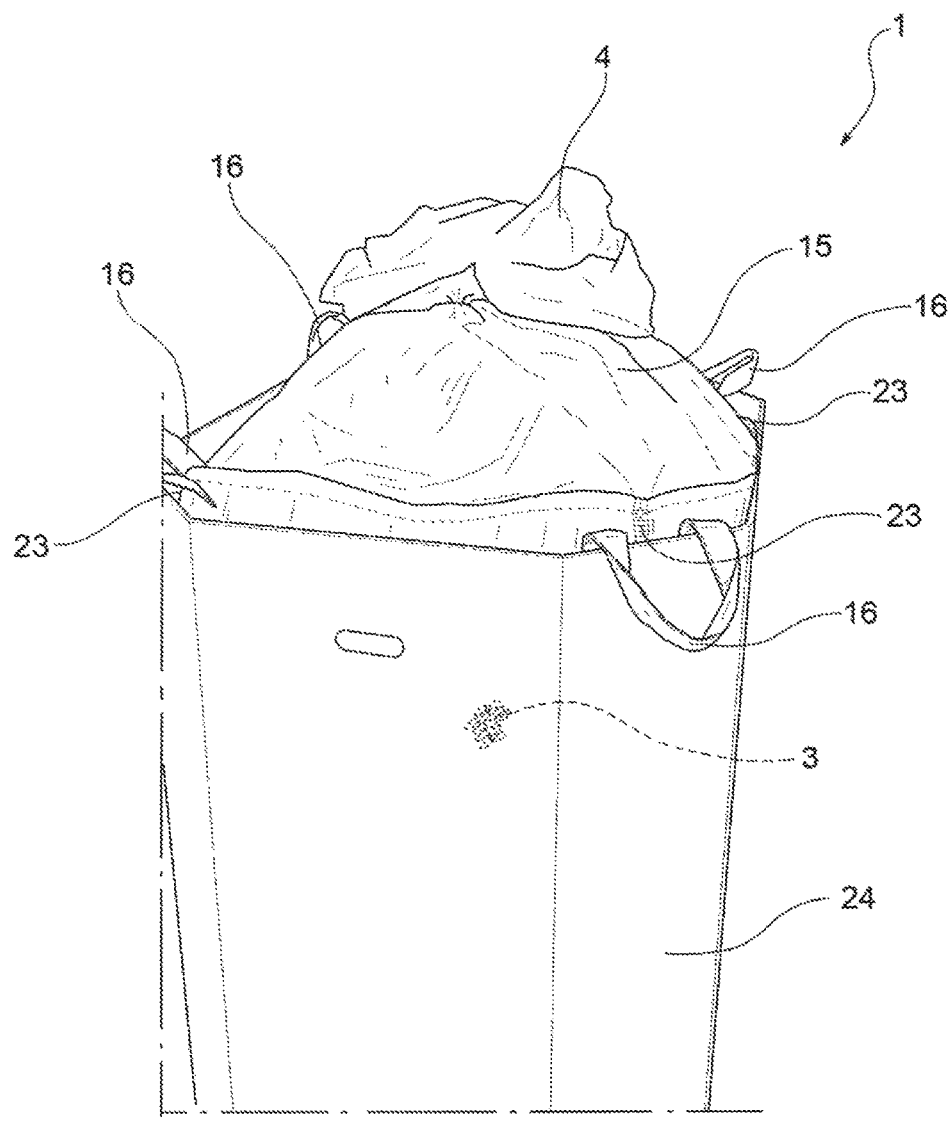
Figure 27:
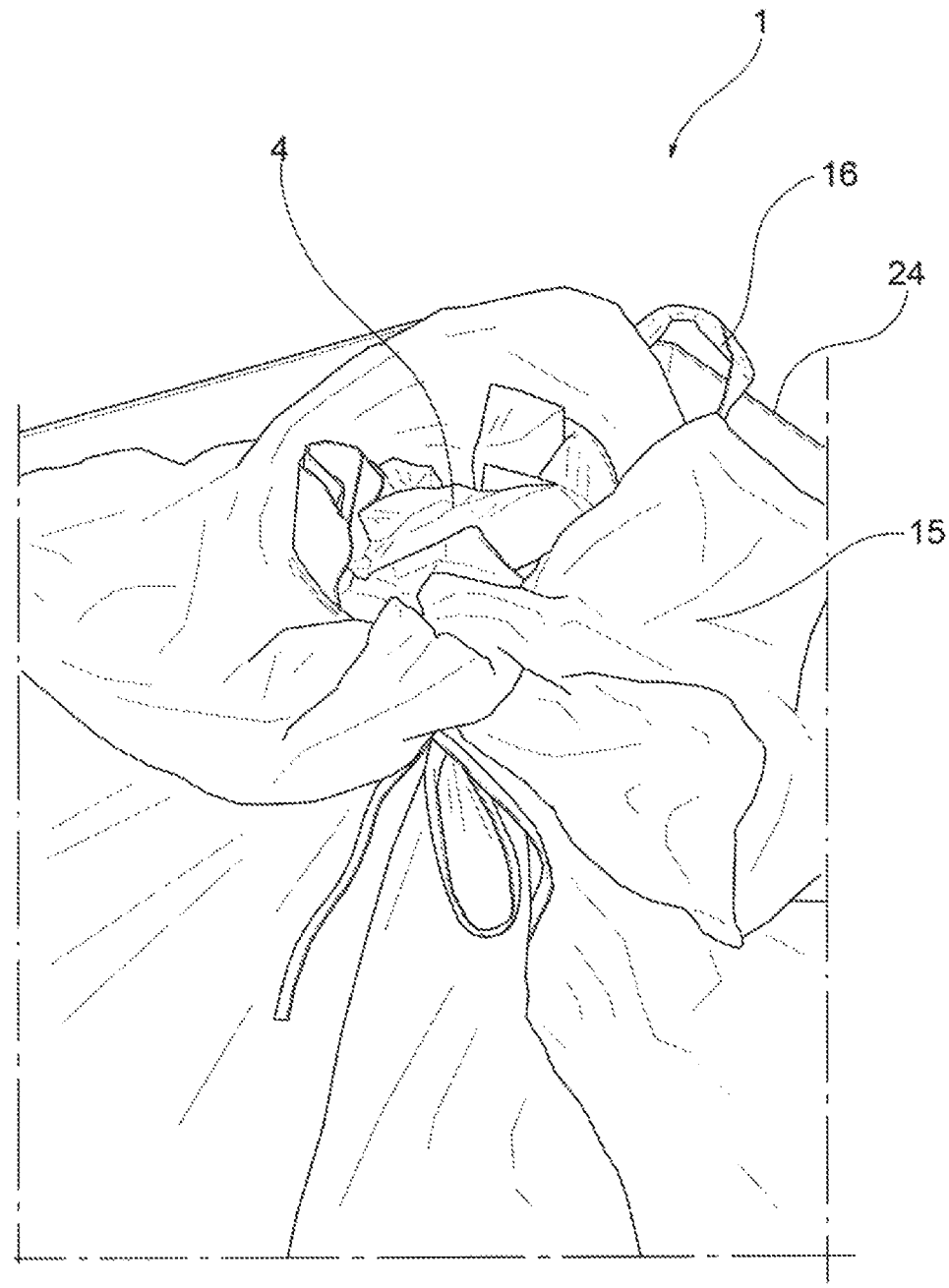
Figure 28:
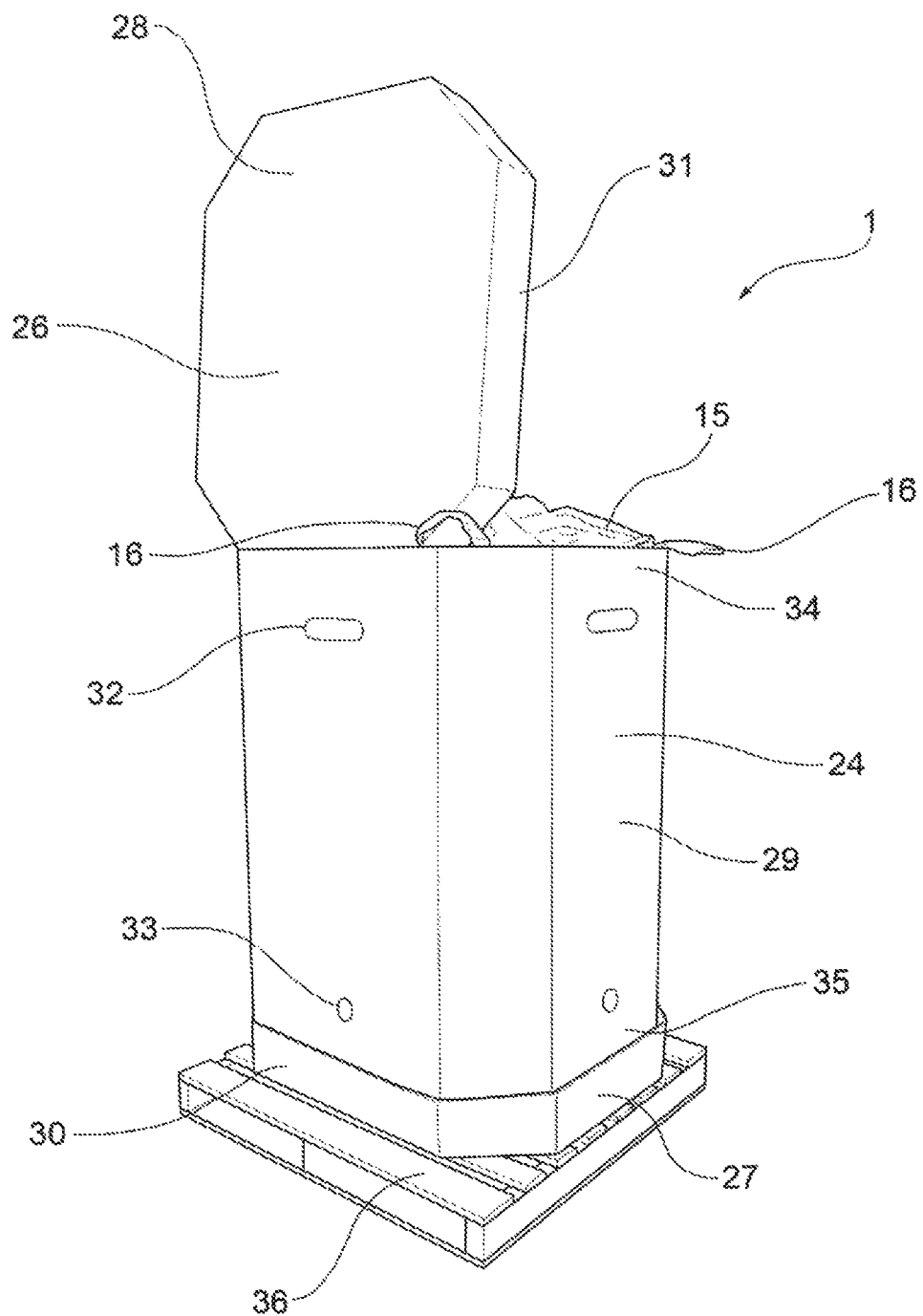
Figure 29:
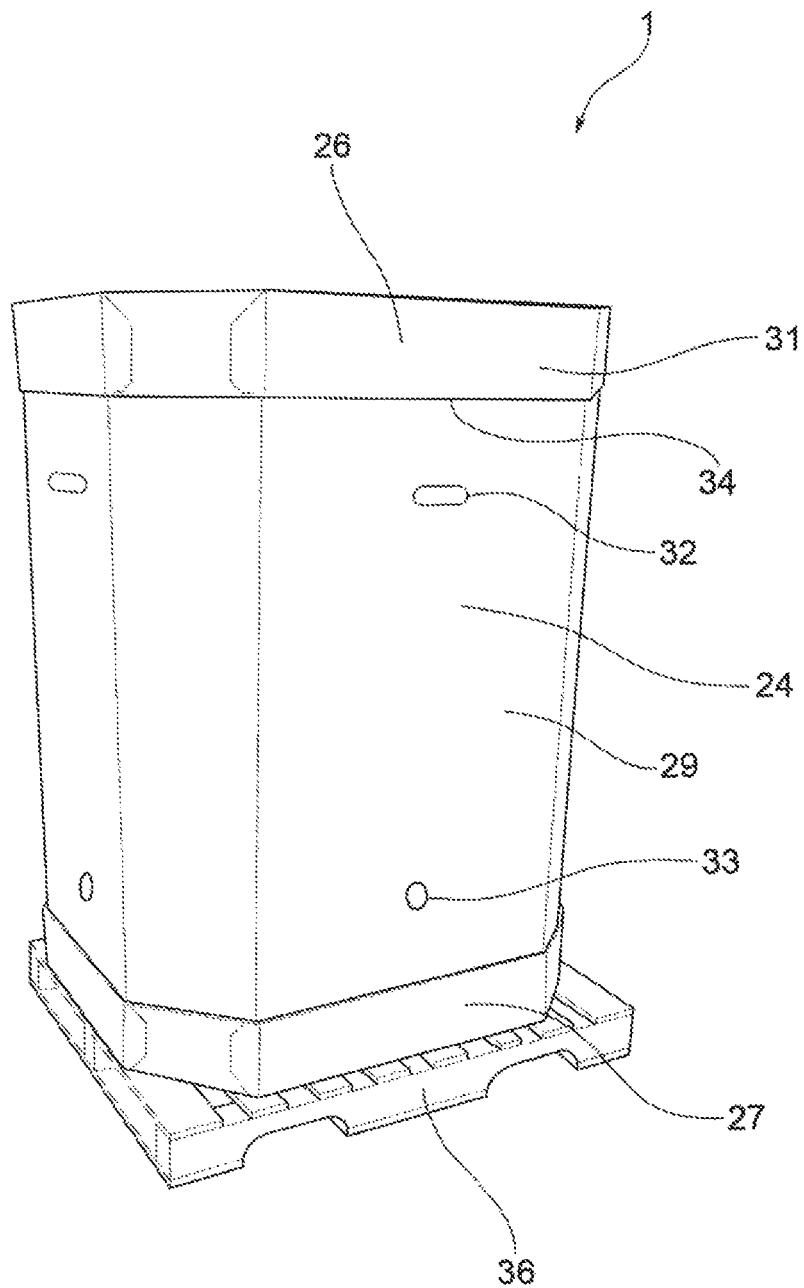
Figure 30:
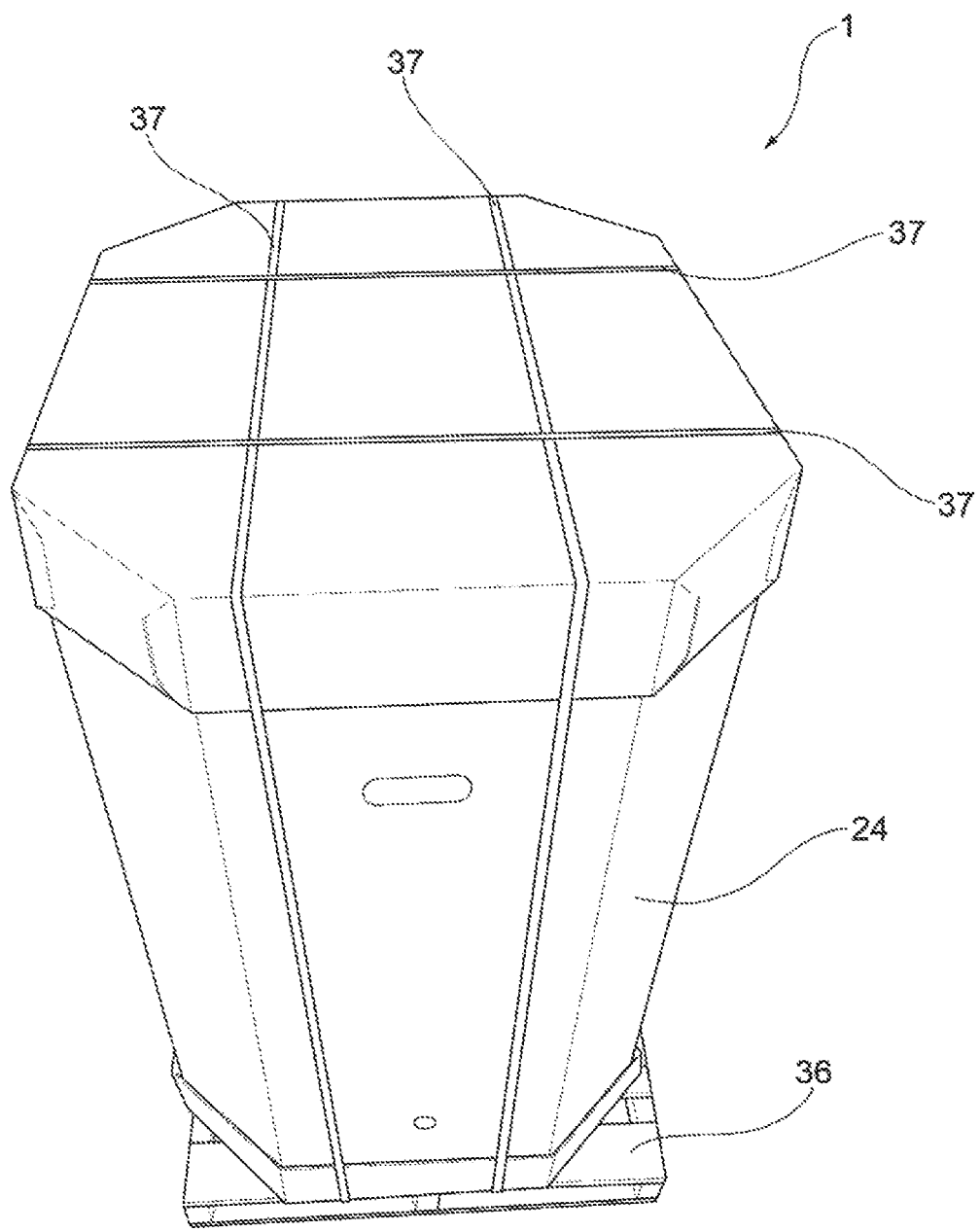
Figure 31:
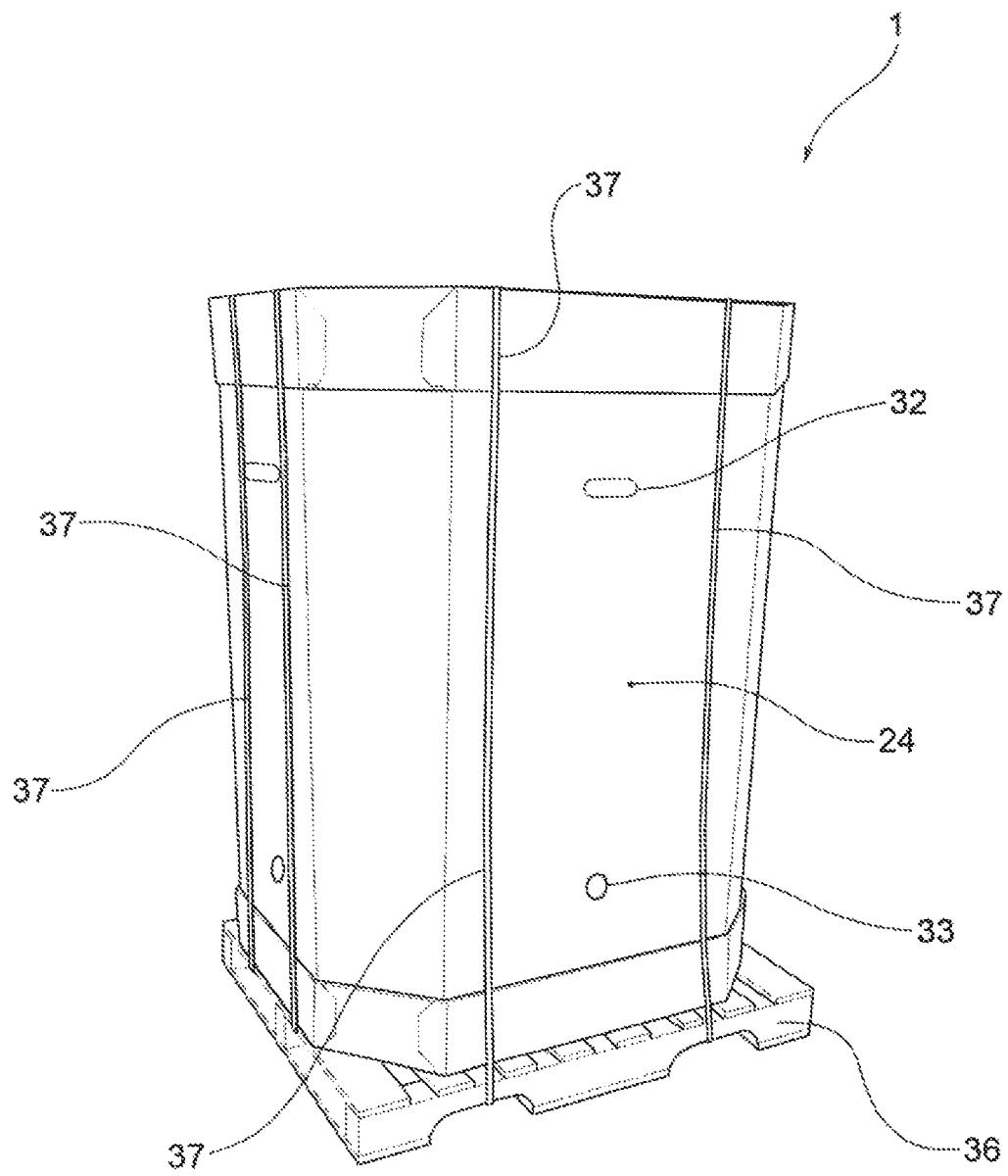
Figure 32:
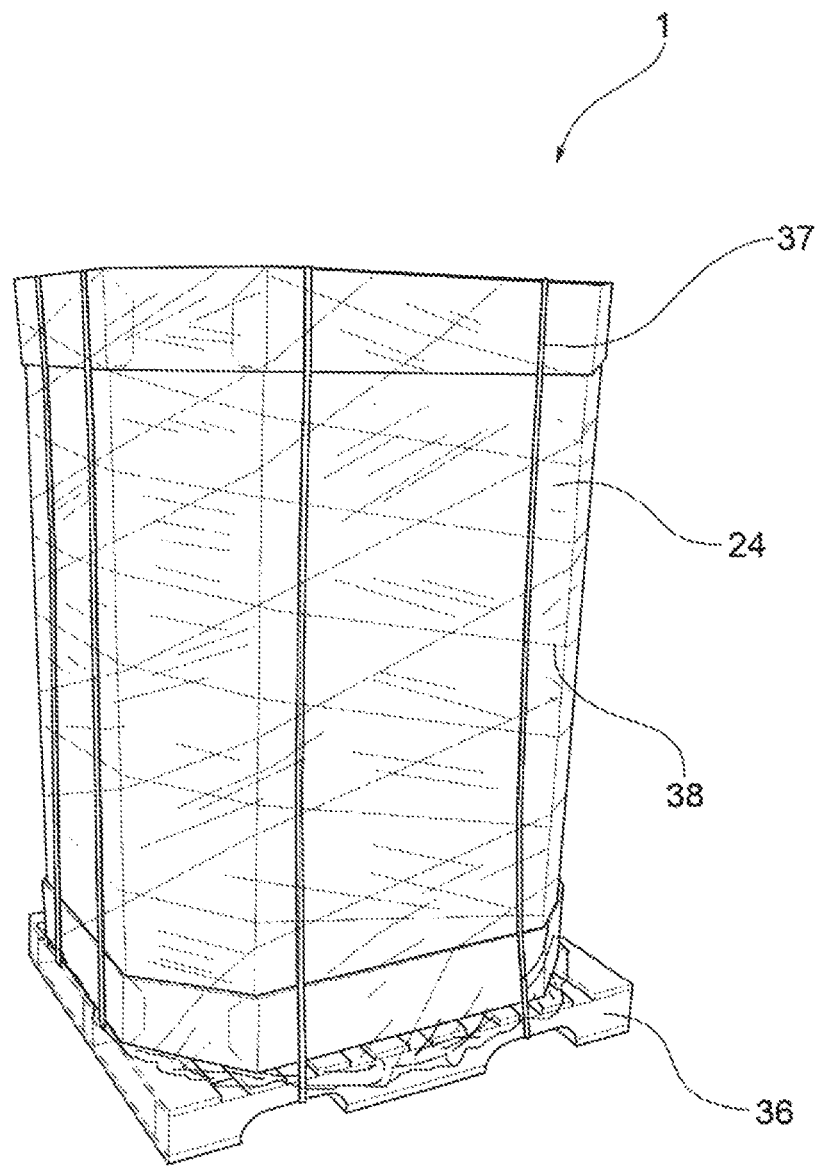
Figure 33:
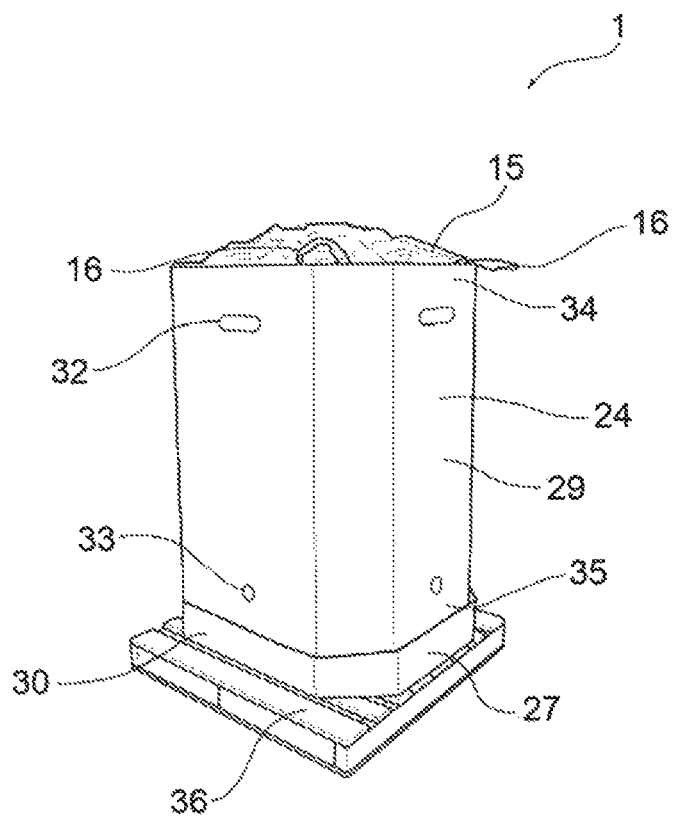
Figure 34:
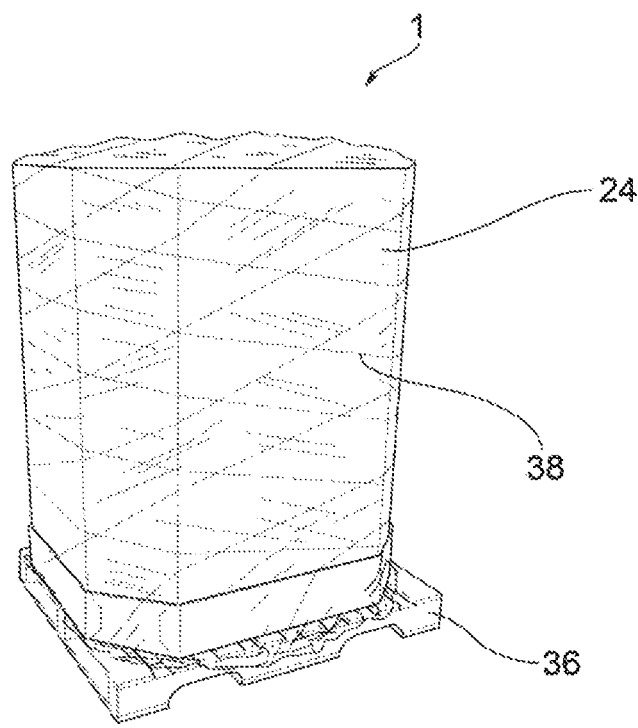
Figure 35:
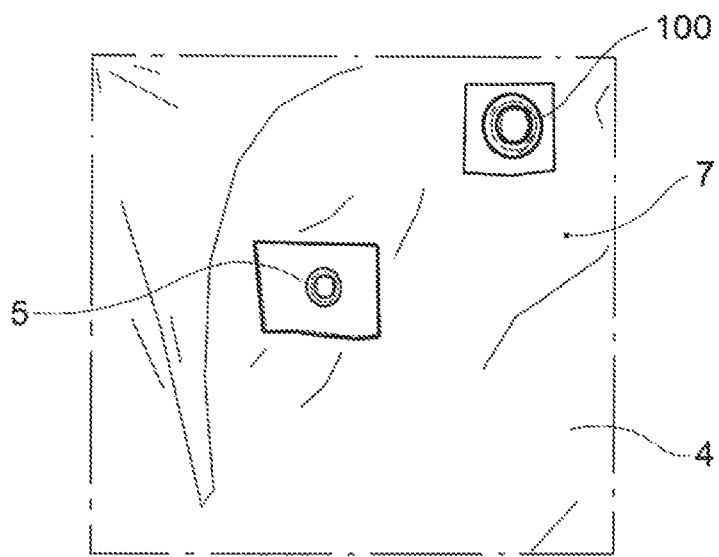
Figure 36:
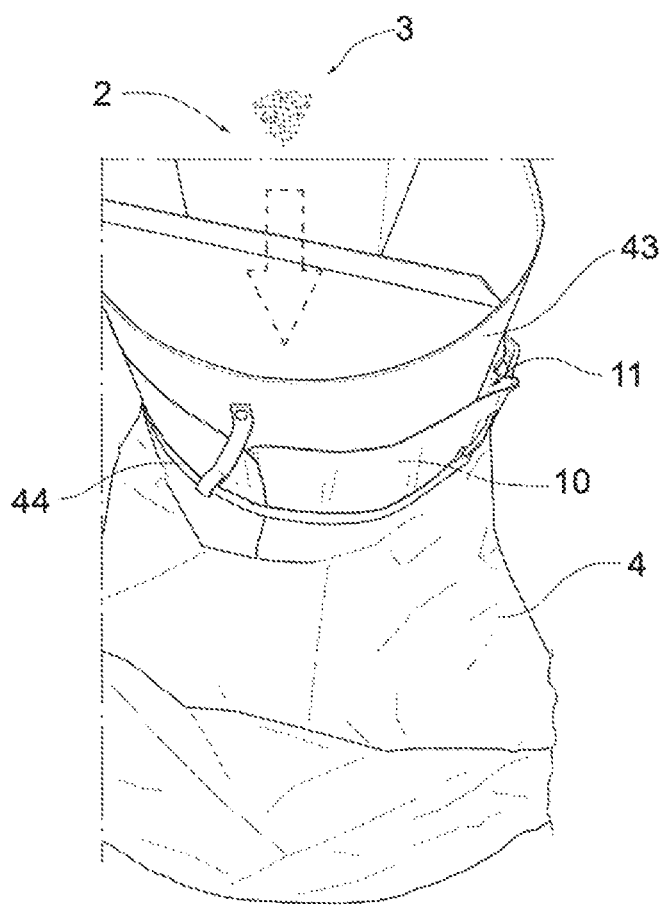
Figure 37:
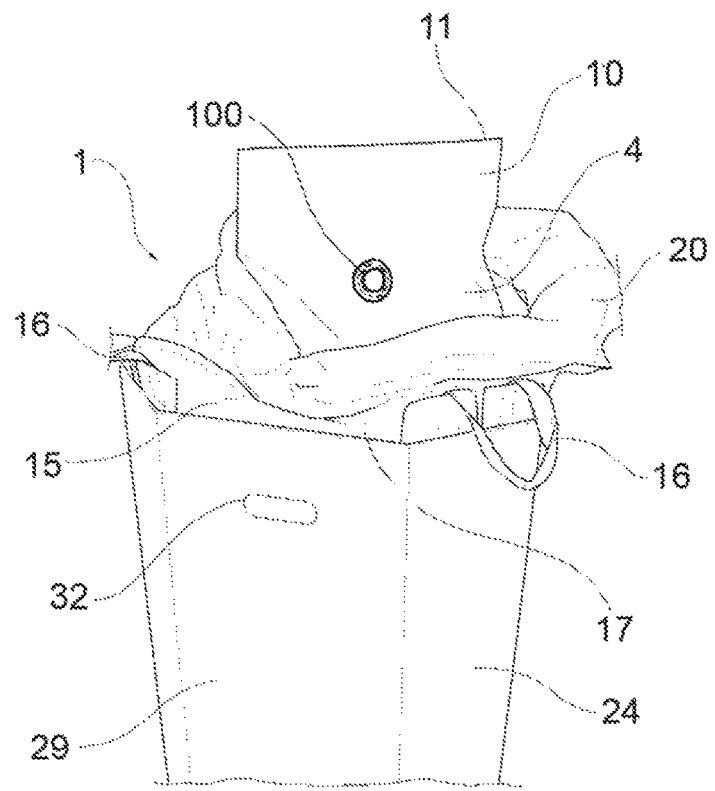
Figure 38:
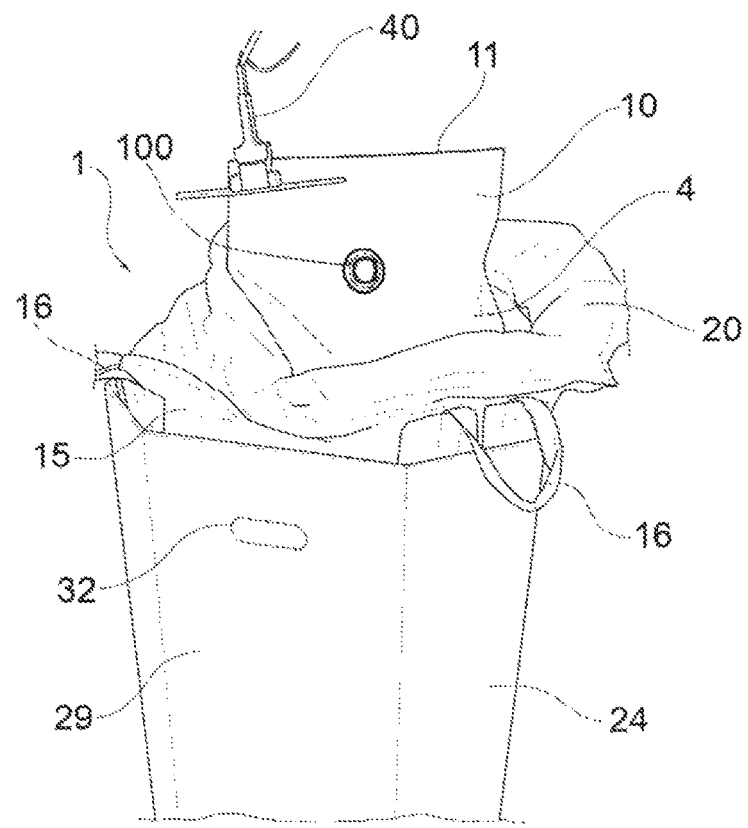
Figure 39:
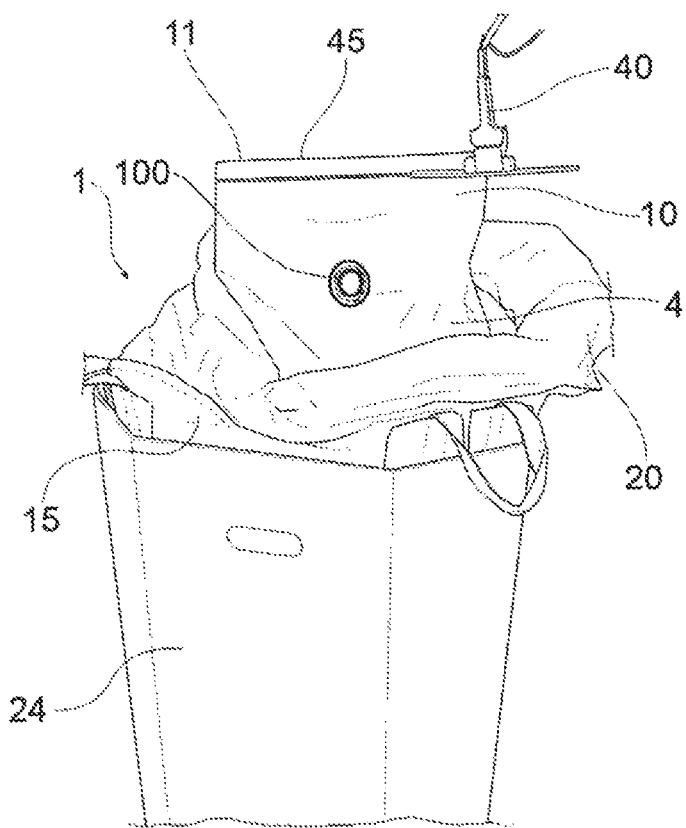
Figure 40:
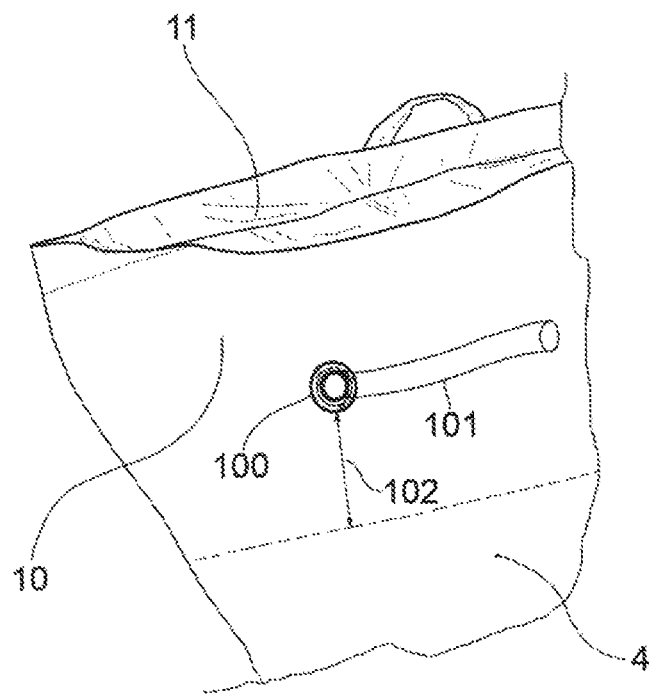
Figure 41:
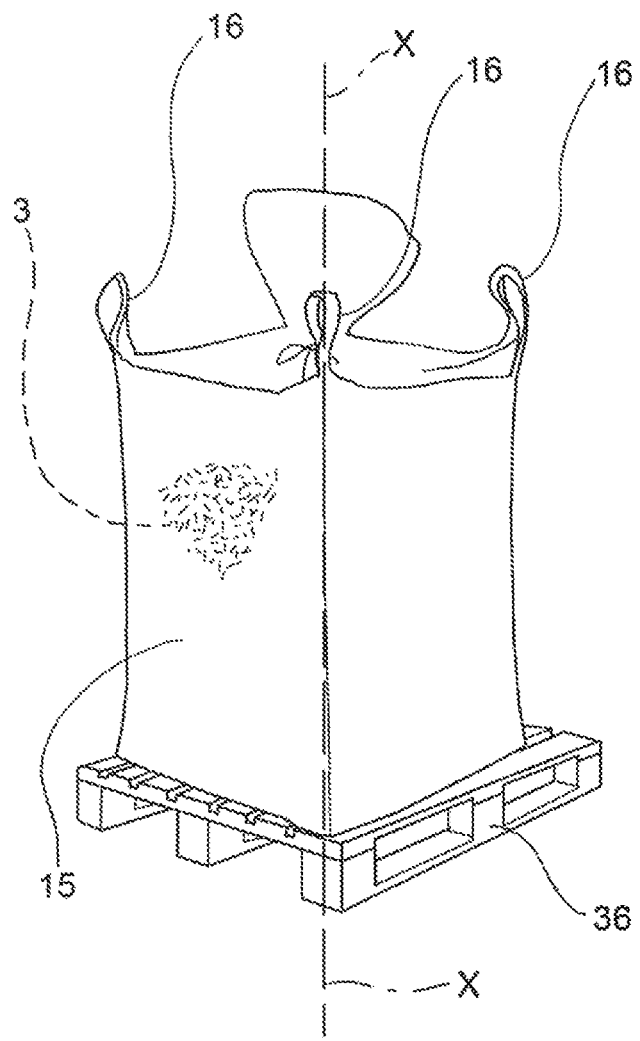

FIG. 11 shows in perspective view the bottom of a self-supporting container placed on a transport pallet and in which is fitted the wall of an octabin type self-supporting container, where the lower edge of the wall is fitted inside the folded and lifted edge of the bottom and in which is placed inside a protection and transport sack open and ready to be hooked with its handles to a support structure placed around the loading hopper of roasted beans;

FIGS. 12 and 13 show in perspective views, subsequent phases of FIG. 11, in which the protection and collection is further open and the handles are hooked to the hooks of the support structure;

FIG. 14 illustrates in perspective view a detail of FIG. 13 in which inside the protection and transport sack a lot impermeable bag is inserted, lying down or inflated because lying to bring its edges aligned with those of the protection and transport sack and with its mouth portion fitted on the loading hopper of the roasted beans;

FIGS. 15 and 16 phases subsequent to FIG. 14 in which the mouth portion of the impermeable bag is tied around the hopper circled by a locking strap so that the impermeable bag remains constrained during the unloading of the coffee in roasted beans inside it;

FIG. 17 illustrates in perspective view a detail of the loading phase of beans in the inner volume of the impermeable bag place inside the protection and transport sack accommodated in the self-supporting container;

FIG. 18 illustrates the assembly of the impermeable bag filled with roasted coffee beans and having the mouth portion folded ready to be closed by heat-sealing, while the impermeable sack is accommodated in the protection and transport sack with its loading portion open and resting on the upper edge of the side wall of the self-supporting container in which said protection and transport sack is accommodated substantially entirely;

FIGS. 19 and 20 show in perspective view two closing steps with heat-sealing of the loading mouth of the impermeable bag of FIG. 18, leaving a gap for the insertion of a nozzle;

FIG. 21 shows a perspective view of an detail of the gap of FIG. 20;

FIG. 22 illustrates a perspective view of an impermeable bag filled with roasted coffee beans, in which a nozzle is inserted in in a gap of the loading mouth to introduce gaseous nitrogen inside the inner volume and wash to beans to reduce the quantity of oxygen present inside the impermeable bag;

FIG. 23 illustrates in perspective view of the step of heat-sealing the gap of the loading mouth after washing the beans with gaseous nitrogen;

FIG. 24 shows an axonometric view of the loading mouth of an impermeable bag sealed by heat-sealing after loading of the beans and washing them nitrogen;

FIGS. 25, 26 and 27 show in perspective view a detail of the assembly of an impermeable bag filled with roasted beans and washed with nitrogen, in which the mouth portion of impermeable bag is tied together with the loading portion of the protection sack, solidly joining the impermeable bag to the protection and transport sack;

FIGS. 28 and 29 show a perspective view of the assembly of an impermeable bag filled with roasted coffee beans and washed with nitrogen, inserted and with this tied in a protection and transport sack, both accommodated in an octabin type self-supporting container, closed by a cover and supported on a transport pallet;

FIGS. 30 and 31 show a perspective view of the assembly of an impermeable bag filled with roasted coffee beans and washed with nitrogen, inserted and with this tied in a protection and transport sack, both accommodated in an octabin type self-supporting container and tied with locking bands or straps;

FIG. 32 illustrates a perspective view of the assembly of FIG. 31 wrapped in a stretchable film for additional protection and stabilisation, which may also be wrapped avoiding the use of bands or straps;

FIG. 33 shows a perspective view of the assembly of an impermeable bag filled with roasted coffee beans, inserted and with this tied in a protection and transport sack, both accommodated in an octabin type self-supporting container, open, i.e., without a cover and resting on a transport pallet and suitable, in this form, to transport the coffee;

FIG. 34 shows a perspective view of the assembly of FIG. 33, but in a different embodiment for a different transport, wrapped in a stretchable film for additional protection and stabilisation and suitable in this further form for the transport of the coffee;

FIG. 35 represents a perspective view of a detail of the side wall portion of an impermeable bag, according to a different embodiment, to which is associated a unidirectional fitting for the attachment of a system for the creation of depression inside the impermeable bag and to which is associated at least one unidirectional valve that allows the escape of gas from the inner volume of the impermeable bag, avoiding the entry of pollutants and air from the outside inside the impermeable bag;

FIG. 36 illustrates in perspective view a detail of the loading phase of ground coffee in the inner volume of the impermeable bag place inside the protection and transport sack accommodated in the self-supporting container, according to a different embodiment;

FIG. 37 illustrates the assembly of the impermeable bag filled with roasted and ground coffee and having the mouth portion folded ready to be closed by heat-sealing, while the impermeable sack is accommodated in the protection and transport sack with its loading portion open and resting on the upper edge of the side wall of the self-supporting container in which said protection and transport sack is accommodated substantially entirely;

FIGS. 38 and 39 show in perspective view two closing steps with heat-sealing of the loading mouth of the impermeable bag of FIG. 37;

FIG. 40 illustrates an axonometric view of the loading mouth of an impermeable bag sealed by heat-sealing after loading the ground coffee, as well as a depression or vacuum system connected to the unidirectional fitting to create a depression inside the impermeable bag; in particular the mouth is placed at a predefined distance from the upper edge of the coffee contained in the impermeable bag;

FIG. 41 shows a perspective view of an assembly comprising an impermeable bag filled with roasted and ground coffee accommodated in the impermeable bag, inserted tied with this in a protection and transport sack placed on a transport pallet.

DESCRIPTION OF SEVERAL PREFERRED EMBODIMENTS

The elements, or parts of elements, in common between the embodiments described below will be indicated with the same reference numbers.

With reference to the figures, and according to a general embodiment, a packaging assembly (1) for the transport and/or warehousing or the storage of coffee (2) roasted (3), in beans or ground comprises at least one impermeable bag (4), of the type impermeable at least at the entrance into its inner volume, when sealingly closed and sealed tight, to oxygen and water vapour.

Said at least one impermeable bag (4) is preferably flexible and sealable so as to prevent the entry of fluids or gases inside it.

Said at least one impermeable bag (4) delimits internally an impermeable bag inner volume of impermeable bag (6). said inner volume of impermeable sack (6) is a single volume and in which is placed roasted and ground coffee (3) for at least 100 kg.

Said assembly further comprises at least one protection and transport bag (15). Said at least one protection and transport sack (15) is fitted over said at least one impermeable bag (4) for protection against the risk of damage of the impermeable bag (4) and to facilitate its handling.

Advantageously, said assembly (1) comprises at least one unidirectional valve (5) sealingly applied to said at least one impermeable bag (4). Said valve (5) allows only the escape of gas from the impermeable bag (4), but avoids the entry of gas in the impermeable bag (4).

Said at least one unidirectional valve (5) allows creating an over-pressure inside the impermeable bag (4) variable from 3 to 9 mbar, preferably variable from 10 to 60 mbar.

According to an embodiment, said at least one unidirectional valve (5) opens upon reaching a pressure, or opening pressure, variable from 20 to 60 mbar and closes upon reaching a pressure, or closing pressure, variable from 10 to 40 mbar.

According to a further embodiment, said at least one unidirectional valve (5) opens upon reaching a pressure, or opening pressure, variable from 3 to 9 mbar and closes at a closing pressure higher than, or equal to, 0.5 mbar. For example, this valve is used for coffee with a higher degree of roasting which determines a need for regulation of the pressure to lower values with respect to a less roasted coffee.

Below will be described alternative embodiments all falling within the scope of this invention.

According to an embodiment, said at least one impermeable bag (4) delimits internally an impermeable bag inner volume (6) of at least 500 litres.

According to an embodiment, said impermeable bag inner volume (6) is between 1100-1600 litres.

According to an embodiment, said impermeable bag inner volume (6) is filled to 60%-80% in volume with roasted coffee beans (3).

According to an embodiment, said impermeable bag inner volume (6) is filled with 350-450 kg of roasted coffee beans (3).

According to an embodiment, said at least one unidirectional valve (5) allows reaching an over-pressure inside the impermeable bag (4) variable from 3 to 60 mbar. According to an embodiment, said at least one unidirectional valve (5) allows reaching an over-pressure inside the impermeable bag (4) variable from 10 to 40 mbar. According to an embodiment, said at least one unidirectional valve (5) allows reaching an over-pressure inside the impermeable bag (4) variable from 20 to 60 mbar. According to an embodiment, said at least one unidirectional valve (5) allows reaching an over-pressure inside the impermeable bag (4) variable from 3 to 9 mbar According to an embodiment, said at least one unidirectional valve (5) are at least two unidirectional valves (5) applied to said impermeable bag (4). Thanks to this embodiment, not only is it possible to ensure greater security in the control of the pressure inside the impermeable bag, but it is also possible to ensure a speedy evacuation of the gas at an excessive over-pressure in an assembly with large loading capacity or volume as that described here. In fact, the speed of reaction of the assembly reaction to over-pressure ensures at the same time greater security that the assembly will not be damaged during its handling or transport.

According to an embodiment, the assembly (1) comprises at least one unidirectional fitting for extraction of fluids such as air (100) and to create an internal depression between −50 mbar and −400 mbar.

According to an embodiment, said inner volume (6), when said at least one impermeable bag (4) is closed and sealed, is under vacuum with depression between −50 mbar to −400 mbar.

According to an embodiment, said unidirectional fitting for extraction of fluids such as air (100) comprises a filter to prevent the ground coffee (3) from being aspirated during the formation of the depression in the volume (6).

According to an embodiment, said unidirectional fitting for extraction of fluids such as air (100) comprises a non-return valve that prevents air from entering into the impermeable bag (4).

According to an embodiment, said unidirectional fitting for extraction of fluids such as air (100) is placed in or near a mouth portion of impermeable bag (10) of the impermeable bag (4).

According to an embodiment, said inner volume of impermeable bag (6) is filled with roasted and ground coffee (3) and said unidirectional fitting for extraction of fluids such as air (100) is placed at least 50 cm above the roasted and ground coffee (3).

According to an embodiment, said inner volume of impermeable bag (6) is a single volume and is filled with roasted and ground coffee (3) for at least 400 kg.

According to an embodiment, said assembly comprises at least one unidirectional valve (5) sealingly applied to said at least one impermeable bag (4) which only allows the outflow of gas from the impermeable bag (4) while preventing the entry of gas in the impermeable bag (4).

According to an embodiment, said at least one unidirectional valve (5) allows creating an over-pressure inside the impermeable bag (4) variable from 10 to 60 a 60 mbar.

In accordance with an embodiment, said impermeable bag (4) is a die-cut blank. Thanks to this embodiment, the impermeable bag is easy to construct by coupling sheets initially cut from a flat sheet into the desired shape and heat-sealing them at their edges to form, for example, a three-dimensional shape.

According to an embodiment, said impermeable bag (4) comprises an impermeable bag side wall portion (7), for example in a parallelepiped shape.

According to an embodiment, said impermeable bag side wall portion (7) has a cross-section, at a longitudinal extension (X-X) of the bag, of quadrangular shape.

According to an embodiment, said impermeable bag side wall portion (7) has four flat lateral surfaces suitable to mate with each other and fill the entire inner space of an outer protective element, such as for example a protection and transport sack, as will be described below. According to an embodiment, said impermeable bag side wall portion (7) has impermeable bag heat sealings (8) to delimit at least four corners.

Differently, and according to an embodiment, said impermeable bag side wall portion (7) is of tubular shape.

According to an embodiment, said at least one unidirectional valve (5) is applied to said at least one impermeable bag side wall portion (7).

According to an embodiment, said impermeable bag (4) comprises an impermeable bag bottom portion (9), for example with inverse conical shape and suitable for emptying the bag when torn at its apical portion to unload the roasted beans when the assembly has arrived at its destination.

According to an embodiment, said impermeable bag (4) comprises a closable impermeable bag mouth portion (10) which defines an impermeable bag opening or loading mouth (11) for introducing roasted coffee beans (3) in the at least one impermeable bag (4).

According to an embodiment, said impermeable bag mouth portion (10) connects said side wall portion (7) to said loading mouth (11) by means of conical walls (12) having a linear shape, so as to facilitate the loading of roasted beans (3) preventing them from stopping or slowing down at the mouth of said impermeable bag (4) itself.

According to an embodiment, the angle between the extension of the side wall portion (7) and the linear conical wall mouth portion (12) is between 20° and 30°, preferably 25°. From experimental tests carried out, this angle turns out to be optimal for the fastest loading of roasted beans from a hopper.

According to an embodiment, a longitudinal axis (X-X) of impermeable bag (4) passes through the loading mouth (11). When the impermeable bag (4) is in an extended position, the transverse dimension of side wall (13) at the longitudinal axis (X-X) of the side wall portion (7) has a dimension at least three times the transverse dimension of loading mouth (14) of the loading mouth (11). This proportion was found through experimental tests to be the optimum proportion for a rapid uniform distribution of roasted beans in the volume of the impermeable bag.

According to an embodiment, said impermeable bag (4) is die-cut and comprises a plurality of walls (7, 9, 10) welded, preferably heat-sealed, together.

According to an embodiment, said impermeable bag (4) has oxygen permeability less than 0.1 cubic centimetres (=millilitre ml)/m²/24 h at 23° C. 0% RH (relative humidity).

According to an embodiment, said impermeable bag (4) has water vapour permeability lower than 0.1 g/m²/24 h at 38° C. and 90% RH.

According to an embodiment, said impermeable bag (4) comprises a polylaminate material body.

According to an embodiment, said impermeable bag (4) comprises at least one wall (7, 9, 10) comprising at least one sheet of aluminium.

According to an embodiment, said impermeable bag (4) comprises at least one wall comprising:
polyester
aluminium
oriented polyamide
coex polyethylene.

According to an embodiment, said impermeable bag (4) comprises at least one wall comprising:
polyester 12 micro-metres thick,
aluminium 6.35 micro-metres thick
oriented polyamide 15 micro-metres thick
coex polyethylene 110 micro-metres thick.

According to an embodiment, said impermeable bag (4) comprises at least one wall comprising:
polyester 12 micro-metres thick,
aluminium 6.35 micro-metres thick
oriented polyamide 15 micro-metres thick
a bi-oriented, co-extruded, polyethylene film 110 micro-metres thick.

According to an embodiment, said sheets are polylaminated to each other with polyurethane adhesive.

According to an embodiment, the assembly (1) comprises roasted coffee beans (3) placed inside the impermeable bag (4).

According to an embodiment, the inner volume of impermeable bag (6) is filled to 60 to 80% of roasted beans or ground coffee (3).

According to an embodiment, said impermeable bag (4) is filled with 350 to 450 kg of roasted coffee (3).

According to an embodiment, said inner volume of impermeable bag (6) contains nitrogen N2 in an amount to reduce the amount of oxygen O2 inside the volume of impermeable bag.

According to an embodiment, said inner volume of impermeable bag (6) is washed with 2 cubic metres of nitrogen with the impermeable bag (4) open, so as to wash the inner volume and the coffee with gaseous nitrogen, expelling air and in particular oxygen from the inner volume.

According to an embodiment, said roasted beans (3) contained in said impermeable bag (4) are washed with nitrogen at least 3-4 times.

According to an embodiment, said inner volume of impermeable bag (6), when sealed, contains nitrogen N2 in an amount to reduce the amount of oxygen to values lower than 6% in volume of the impermeable bag (4).

According to an embodiment, when the impermeable bag is sealed and containing roasted coffee (3), the amount of oxygen present in the inner volume of impermeable bag (6) is less than 6% in inner volume of the impermeable bag (6).

According to an embodiment, when the impermeable bag is sealed and containing roasted coffee (3), the amount of oxygen present in its inner volume of impermeable bag (6) is less than 5% in inner volume of the impermeable bag (6).

In accordance with an embodiment, said assembly comprises at least one protection and transport sack (15).

According to an embodiment, said at least one protection and transport sack (15) is fitted over said at least one impermeable bag (4) for protection against the risk of damage of the impermeable bag (4) and to facilitate its handling.

Said at least one protection and transport sack (15) is flexible.

According to an embodiment, said protection and transport sack (15) is of the Flexible Intermediate Bulk Container, or FIBC, type for the transport of bulk items.

According to an embodiment, said protection and transport sack (15) comprises loops or handles (16) suitable for handling the assembly (1).

According to an embodiment, said protection and transport sack (15) comprises four handles (16).

According to an embodiment, said protection and transport sack (15) comprises a tubular protection and transport sack wall (17), as well as a protection and transport sack bottom (18) with closable protection and transport sack discharging or unloading opening (19) and a protection and transport sack loading portion (20) delimiting a closable protection and transport sack loading opening (21), preferably mechanically closable, for example by means of a drawstring.

According to an embodiment, said protection and transport sack (15) comprises a protection and transport sack closure (22), preferably a knot or a tie, tied around said protection and transport sack loading portion (20) simultaneously tying together the impermeable bag mouth portion to solidly join said protection and transport sack and said impermeable bag that, at the time of unloading, are hung together, for example thanks to the handles (16) and the impermeable bag is emptied by first opening the bottom of the protection and transport sack and then cutting the bottom of the impermeable bag.

According to an embodiment, said protection and transport sack (15) has a parallelepiped shape.

According to an embodiment, said protection and transport sack (15) has a cylinder shape.

According to an embodiment, said protection and transport sack (15) comprises a longitudinal axis (X-X) and said protection and transport sack (15) has a cross-section to said longitudinal axis of quadrangular shape.

According to an embodiment, said handles (16) are provided near four corners of the protection and transport sack (23) for transporting or hanging said sack without deforming it.

According to an embodiment, said protection and transport sack (15) comprises a body in tubular fabric, preferably sewn defining corners (23).

According to an embodiment, said protection and transport sack (15) comprises a body that comprises polypropylene.

According to an embodiment, said protection and transport sack (15) comprises a body that comprises fabric comprising polypropylene.

According to an embodiment, said protection and transport sack (15) comprises a body that comprises at least one layer comprising polypropylene.

According to an embodiment, said protection and transport sack (15) comprises a body that comprises at least one layer comprising raffia fabric.

According to an embodiment, said protection and transport bag (15) comprises a body that comprises at least one layer comprising at least one layer made of jute and/or non-woven fabric.

According to an embodiment, the assembly (1) comprises at least one self-supporting container (24) defining a self-supporting container inner volume (25) closable by a self-supporting container lid (26) and a self-supporting container bottom (27) in which at least one impermeable bag (4) is inserted on which at least one protection and transport sack (15) is fitted.

According to an embodiment, said self-supporting container (24) is of the octabin type.

According to an embodiment, said self-supporting container (24) is of the pallet size box type.

According to an embodiment, said self-supporting container (24) is made of shaped and die-cut sheets.

According to an embodiment, said self-supporting container (24) comprises a body comprising at least one corrugated cardboard layer (28).

According to an embodiment, said self-supporting container (24) comprises die-cut self-supporting container walls (29).

According to an embodiment, said self-supporting (24) comprises fitted or glued joints, avoiding hooks or clips or staples.

According to an embodiment, said self-supporting container walls (29) comprise glued joints, avoiding hooks or clips or staples.

According to an embodiment, said self-supporting container (24) comprises a self-supporting container bottom (27) which comprises a self-supporting container bottom edge (30) folded into a self-supporting container walls (29) containment element.

According to an embodiment, said self-supporting container walls (29) are inserted in said self-supporting container bottom (27) and rest thereon at the self-supporting container bottom edge (30).

According to an embodiment, said self-supporting container (24) comprises a self-supporting container lid (27) which comprises a self-supporting container lid edge (30) folded into a self-supporting container walls (29) containment and closure element.

According to an embodiment, said self-supporting container lid (26) is fitted to the self-supporting container walls (29).

According to a further embodiment, the fitting of said self-supporting container lid (26) on the self-supporting container (29) for transport in this form (FIG. 33) is avoided.

According to an embodiment, at least one self-supporting container wall (29) comprises at least one inspection window (32, 33) forming a through opening.

According to an embodiment, at least one of the self-supporting container walls (29) comprises at least two windows.

According to an embodiment, said at least one inspection window (32, 33) is placed in near to an upper edge of the wall (34) next to the lid (26) or to the upper edge without lid, to allow the inspection of the seal of the impermeable bag (4) after a predetermined period of time that allows the escape of gas (CO2) from the roasted beans and the formation in the volume of impermeable bag (4) of an over-pressure that manifests the proper closure of the impermeable bag (4).

According to an embodiment, said at least one inspection window (32, 33) is placed near a lower edge of the wall (35) near the self-supporting container bottom (27).

According to an embodiment, said at least one window (32, 33) is placed 200-300 mm from the edge (34, 35) of the self-supporting container wall (29).

According to an embodiment, said self-supporting container wall (29) comprises an upper window (32) and a lower window (33).

According to an embodiment, said upper window (32) is used to test the sealed closure of the impermeable bag (4) containing the coffee in over-pressure. For example, through this window (32) it is possible to check, after filling and sealing the impermeable bag, that it is in over-pressure by pressing the protection and transport sack fitted on the impermeable bag with a hand or sensor.

According to an embodiment, said lower window (33) is used to insert a needle probe into the protection and transport sack (15) and into the impermeable bag (4) and test the gases inside the impermeable bag (4). For example, in this way it is possible to test the amount of oxygen present in the impermeable bag before emptying it.

According to an embodiment, said upper window (32) is used to test the seal of the impermeable bag (4) containing the coffee under vacuum.

According to an embodiment, said upper window (32) is used to test the sealed closure of the impermeable bag (4) containing the coffee in over-pressure or depression. For example, through this window (32) it is possible to check, after filling and sealing the impermeable bag, that it is in over-pressure by pressing the protection and transport sack fitted on the impermeable bag with a hand or sensor.

According to an embodiment, said packaging assembly (1) comprises at least one transport pallet (36) on which rests the protection and transport sack (15) within which the at least one impermeable bag (4) is inserted in which is placed roasted and ground coffee (3).

According to an embodiment, said packaging assembly (1) comprises strapping, or locking bands (37), which embrace closing said protection and transport sack (15).

According to an embodiment, said packaging assembly (1) comprises at least one stretchable film (38) wrapped around said protection and transport sack (15) to protect, waterproof and stabilise it. According to an embodiment, said stretchable film (38) wrapped around said protection and transport sack (15) is used without first locking the bag with the strapping (37).

According to an embodiment, said packaging assembly (1) comprises at least one transport pallet (36) which the self-supporting container (24) rests on.

According to an embodiment, said packaging assembly (1) comprises strapping or locking bands (37) which embrace said self-supporting container (24), closing it. According to an embodiment, this strapping is both provided in the embodiment that sees the assembly provided with a lid (26) and alternatively in the assembly where the use of the lid (26) is avoided.

According to an embodiment, said strapping (37) also embraces said transport pallet (36), solidifying and stabilising the assembly (1).

According to an embodiment, said packaging assembly (1) comprises at least one stretchable film (38) wrapped around the self-supporting container (24) to protect, waterproof and stabilise it.

According to an embodiment, said at least one stretchable film (38) is also wrapped around the transport pallet (36) to solidify and stabilise the assembly (1), avoiding the use of the strapping (37).

Below, we will describe a method of packaging roasted coffee beans.

According to a general embodiment, a packaging method of roasted coffee beans (3) comprises at least the steps of:
providing the roasted coffee beans (3);
inflating air in a flexible, sealed impermeable bag (4) to open it ready to receive the roasted coffee beans;
pouring the coffee beans (3) into a flexible and sealable impermeable bag (4);
sealing said impermeable bag (4);
preventing gas or fluids from entering the impermeable bag (4);
adjusting the pressure inside the impermeable bag (4) so that it is between 3 and 60 mbar with respect to external pressure.

According to an embodiment, a method comprises one or more of the further steps listed below:
adjusting the pressure inside the impermeable bag (4) so that it is between 3 and 9 mbar with respect to external pressure; and/or
adjusting the pressure inside the impermeable bag (4) so that it is between 10 and 60 mbar with respect to the external pressure; and/or
adjusting the pressure inside the impermeable bag (4) so that it is between 10 and 40 mbar with respect to the external pressure; and/or
pouring into said impermeable bag (4) a quantity of roasted coffee occupying a minimum volume of at least 500 litres; and/or
pouring into said impermeable bag (4) a quantity of roasted coffee occupying a volume varying from 1100 to 1600 litres; and/or
pouring into said impermeable bag (4) a quantity of roasted coffee varying from 350 kg to 450 kg; and/or
filling the impermeable bag (4) with roasted coffee beans (3) up to 60-80% of the impermeable bag inner volume (6); and/or
  adjusting the pressure inside the impermeable bag (4) so that it is between 3 and 60 mbar with respect to external pressure or atmospheric pressure; and/or
  adjusting the pressure inside the impermeable bag (4) so that it is between 3 and 9 mbar with respect to external pressure or atmospheric pressure; and/or
  adjusting the pressure inside the impermeable bag (4) so that it is between 10 and 40 mbar with respect to external pressure or atmospheric pressure; and/or
  adjusting the pressure inside the impermeable bag (4) so that it is between 10 and 60 mbar with respect to external pressure or atmospheric pressure; and/or
before sealing the impermeable bag (4) introducing nitrogen N2 into the impermeable bag (4) so as to bring the amount of oxygen inside the impermeable bag (4) to below 6% of the total volume inside the sealed bag, preferably below 5%; and/or
  inserting into the impermeable bag (4) nitrogen N2 for a quantity at least 1.3 times greater than the volume of the impermeable bag (6); and/or
rinsing the roasted coffee beans (3) present in the impermeable bag (4) with 2 cubic metres of nitrogen in a total sack volume (6) of 1500 litres filled up to 60-80% in volume with roasted beans; and/or
preventing gas or fluids from entering the impermeable bag (4) by creating a barrier to oxygen that has an oxygen permeability of less than 0.1 cc (cubic centimetres=millilitres ml)/m$^2$/24 h at 23° C. 0% RH (relative humidity); and/or
preventing gas or fluids from entering the impermeable bag (4) by creating a barrier to water vapour that has a water vapour permeability of less than 0.1 g/m$^2$/24 h at 38° C. 90% RH; and/or
inserting the impermeable bag (4) in a protection and transport sack (15); and/or
before inserting the impermeable bag (4), tying and closing the protection and transport sack bottom (15); and/or
tying and closing, joining them, the impermeable bag mouth portion (10) and the protection and transport sack loading portion (20); and/or
inserting the protection and transport sack (15) in a self-supporting container (24); for example of the octabin type; and/or
verifying through the at least one window (32) of the self-supporting container (24) that the impermeable bag (4) is under pressure after it has been filled with coffee and sealed tight; and/or
verifying through the at least one window (33) of the self-supporting container (24) that the oxygen in the impermeable bag (4) is less than 6% in volume of the impermeable bag (4) upon delivery of the assembly to its destination; and/or
verifying through the at least one window (33) of the self-supporting container (24) that the oxygen in the impermeable bag (4) is less than 5% in volume of the impermeable bag (4) upon delivery of the assembly to its destination.

According to an embodiment, a method of packaging of roasted and ground coffee (3), comprises, not necessarily in the order listed here, at least the steps of:
providing roasted and ground coffee (3);
pouring ground coffee (3) in a flexible and sealable impermeable bag (4) in such a way that said ground coffee (3) is in the minimum amount of roasted coffee of 100 kg;
inserting the impermeable bag (4) in a protection and transport sack (15).

According to an embodiment, a method comprises at least one or more of the further steps listed below:
inserting the impermeable bag (4) in a protection and transport sack (15) before pouring the ground coffee; and/or
before pouring ground coffee (3), blowing air and/or nitrogen into the flexible and sealable impermeable bag (4) opening its inner volume to receive ground coffee beans (3); and/or
pouring in said impermeable bag (6), in a single inner volume, 350 to 450 kg of roasted and ground coffee (3); and/or
sealing said impermeable bag (4); and/or
  preventing gas or fluids from entering the impermeable bag (4); and/or
creating a depression in said impermeable bag (4) of between −50 mbar and −400 mbar; and/or
  filtering during the creation of the inner depression in said impermeable bag (4) to prevent the ground coffee (3) from being aspirated during the formation of the depression; and/or
preventing air from entering into the impermeable bag (4) during the creation of the depression in said impermeable bag (4); and/or adjusting the pressure inside the impermeable bag (4) so that it is between 10 and 60 mbar with respect to the external pressure; and/or inserting the protection and transport sack (15) in a self-supporting container (24).

According to an embodiment, a method comprises at least one or more of the further steps listed below:

pouring into said impermeable bag (4) a quantity of roasted coffee occupying a minimum volume of at least 500 litres; and/or pouring into said impermeable bag (4) a quantity of roasted coffee occupying a volume varying from 1100 to 1600 litres; and/or pouring into said impermeable bag (4) a quantity of roasted coffee varying from 350 kg to 450 kg; and/or filling the impermeable bag (4) with roasted and ground coffee (3) for 60 to 80% of its inner volume of impermeable bag (6); and/or adjusting the pressure inside the impermeable bag (4) so that it is between 10 and 40 mbar with respect to external pressure or atmospheric pressure; and/or before sealing the impermeable bag (4) and before pouring the ground coffee (3), inserting air into the impermeable bag (4); and/or—before sealing the impermeable bag (4) and before pouring the ground coffee (3), inserting nitrogen N2 into the impermeable bag (4) so as to bring the amount of oxygen inside the impermeable bag (4) to below 6% of the total inner volume with bag sealed, preferably below 5%; and/or inserting into the impermeable bag (4) nitrogen N2 for a quantity at least 1.3 times greater than the volume of the impermeable bag (6); and/or washing the impermeable bag (4) with 2 cubic metres of nitrogen on a total bag volume (6) of 1500 litres to be filled to 60 to 80% by volume of the roasted and ground coffee; and/or preventing gas or fluids from entering the impermeable bag (4) by creating a barrier to oxygen which has an oxygen permeability of less than 0.1 cc (cubic centimetres=millilitres ml)/m$^2$/24 h at 23° C. 0% Rh (relative humidity); and/or preventing gas or fluids from entering the impermeable bag (4) by creating a barrier to water vapour that has a water vapour permeability of less than 0.1 g/m$^2$/24 h at 38° C. 90% RH; and/or before inserting the impermeable bag (4) in a protection and transport bag (15), knotting and closing the bottom of the protection and transport bag (15); and/or tying and closing, joining them, the impermeable bag mouth portion (10) and the protection and transport sack loading portion (20); and/or inserting the protection and transport sack (15) in a self-supporting container (24); for example of the octabin type; and/or checking through the at least one window (32) of the self-supporting container (24) that the impermeable bag (4) is under vacuum after it has been filled with coffee and sealed; and/or checking through the at least one window (33) of the self-supporting container (24) that the oxygen in the impermeable bag (4) is less than 6% by volume of the impermeable bag (4) at the time of use of the roasted and ground coffee (3), for example for consumption or, more probably, for a subsequent processing step; and/or checking through the at least one window (33) of the self-supporting container (24) that the oxygen in the impermeable bag (4) is less than 5% by volume of the impermeable bag (4) at the time of use of the roasted and ground coffee (3).

Below, we will describe a method of packaging roasted coffee beans according to an embodiment.

A method comprising the following steps in succession:

1) making from the die-cut the self-supporting container bottom (27) and self-supporting container walls (29), resting said container on a transport pallet (36);

2) closing the protection and transport sack (24) closing the protection and transport sack bottom (18) by means of a knot (22);

3) inserting the protection and transport sack (15) inside the self-supporting container (24);

4) attaching the handles (16), preferably four, of the protection and transport sack (15) to hooks (42) of a protection and transport sack support structure (41) placing the protection and transport sack loading opening (21) under the coffee filling hopper (43);

5) inserting the impermeable bag (4) inside the protection and transport sack (15) positioning the latter in such a way that the corners of the impermeable bag (4) are substantially aligned with the corners of the protection and transport sack (15);

6) blowing air or nitrogen into the impermeable bag (4) to allow its complete unfolding or inflation to form an accessible inner volume, making available the greatest possible filling volume;

7) tying the impermeable bag loading opening or mouth (11) to the filling hopper (43), by means of a locking strap (44);

8) pouring the roasted coffee (3) in the impermeable bag (4) through the filling hopper (43);

9) detaching the impermeable bag loading mouth (11) from the filling hopper (43) and proceeding to heat seal both sides of the impermeable bag loading mouth (11), leaving an insertion gap for the flushing nozzle (45) that allows the insertion of a flushing nozzle (39); flushing gaseous nitrogen in the inner volume of impermeable bag (6); or, alternatively, detaching the impermeable bag loading mouth (11) from the filling hopper (43) and proceeding to heat seal the impermeable bag loading mouth (11) 10) connecting an extraction system to a unidirectional fitting (100) provided in the impermeable bag (4), and creating an inner depression in said impermeable bag (4) comprised between −50 mbar and −400 mbar and/or connecting an aspiration system to a unidirectional fitting (100) provided in the impermeable bag (4) and creating an inner depression in said impermeable bag (4) until said impermeable bag no longer shows any change of shape or volume;

10) heat-sealing the gap (45) so that the impermeable bag (4) is sealed tight;

11) folding the impermeable bag loading mouth (11) and tying it with a common knot to the protection and transport sack (15) solidifying the protection and transport sack (15) and the impermeable bag (4);

12) fitting, or not, the self-supporting container lid (26), closing the self-supporting container (24).

According to an embodiment, even the following further steps can be added in succession, optionally and if necessary:

13) placing locking straps or bands (37) around the self-supporting container to seal the assembly (1) and/or wrapping it with stretchable film (38) to protect and stabilise the self-supporting container (24) placed on the pallet (36); and/or verifying the over-pressure inflation of the impermeable bag (4) after a predefined time after filling with coffee beans (3) and sealing tight; and/or performing the aforesaid check through the upper window (32); and/or after a predetermined time from 2 h to 36 h;

14) checking with a needle probe, for example of an instrument that measures the gaseous compositions in an environment, the oxygen present in the inner volume (6) of the impermeable bag (4), for example passing through the inspection window (33) and puncturing the stretchable film (38), protection and transport sack (15) and impermeable bag (4) in over-pressure; and/or unloading the roasted coffee (3) by opening the self-supporting container (24), lifting the protection and transport sack (15) by means of the handles (16), opening the knot in the bottom of protection and transport sack (18) and cutting the impermeable bag bottom portion (9).

To the embodiments described above, a technician in the field, to satisfy contingent requirements, may make numerous modifications, adaptations and replacements of members with others functionally equivalent, without departing from the scope of the following claims.

According to an embodiment, the impermeable bag is closed by welding the flaps of its opening(s). This welding is referred to above as "heat-sealing". However, this welding can be carried out by sealing bar and/or induction thermal welding. For example, but not necessarily, for an automated industrial production of impermeable bags, induction welding could be a preferable technical solution.

LIST OF REFERENCES

1 Packaging assembly
2 Coffee
3 Roasted beans and/or ground
4 Impermeable bag
5 Unidirectional valve
6 Inner volume of impermeable bag
7 Impermeable bag side wall portion
8 Heat-sealing of impermeable bag
9 Impermeable bag bottom portion
10 Impermeable bag mouth portion
11 Impermeable bag loading opening or mouth
12 Conical walls
13 Transverse dimension of side wall
14 Transverse dimension of loading mouth
15 Protection and transport sack
16 Loops or handles
17 Tubular protection and transport sack wall
18 Protection and transport sack bottom
19 Protection and transport sack unloading opening
20 Protection and transport sack loading portion
21 Protection and transport sack loading opening
22 Protection and transport sack closure
23 Protection and transport sack corners
24 Self-supporting container
25 Inner volume of self-supporting container
26 Self-supporting container lid
27 Self-supporting container bottom
28 Layer of corrugated cardboard
29 Walls of self-supporting container
30 Self-supporting container bottom edge
31 Self-supporting container lid edge
32 Upper inspection window
33 Lower inspection window
34 Upper edge of the wall
35 Lower edge of the wall
36 Transport pallet
37 Locking straps or bands
38 Stretchable film
39 Nitrogen and/or air flushing nozzle
40 Heat-sealer or welder
41 Protection and transport sack support structure
42 Hooks
43 Hopper
44 Strap locking the impermeable bag to the hopper
45 Flushing nozzle insertion gap
100 Unidirectional fitting for connecting the aspiration system for creating a vacuum;
101 System for creating a strong depression or so-called vacuum;
X-X longitudinal axis of the assembly and in particular to the impermeable bag, protection and transport sack and self-supporting container.

The invention claimed is:

1. Packaging assembly for the transport or storage of roasted coffee, comprising:
at least one impermeable bag, impermeable at least to oxygen and water vapour;
said at least one impermeable bag being flexible and sealable in a watertight manner to prevent the introduction of fluids or gases inside the impermeable bag;
wherein
said at least one impermeable bag internally delimits an inner volume of impermeable bag;
characterised in that
said inner volume of impermeable bag is a single volume and in which is placed roasted and ground coffee for at least 100 kg;
said assembly further comprises at least one protection and transport sack;
said at least one protection and transport sack is fitted over said at least one impermeable bag for protection against the risk of damage of the impermeable bag and to facilitate its handling;
said assembly also comprises at least one unidirectional valve sealingly applied to said at least one impermeable bag and that only allows gas to escape from the impermeable bag preventing the entry of gas into the impermeable bag, wherein said at least one unidirectional valve makes it possible to achieve an overpressure inside the impermeable bag variable from 3 to 60 mbar.

2. Packaging assembly according to claim 1, wherein
said at least one unidirectional valve allows creating an over-pressure inside the impermeable bag variable from 10 to 60 a 60 mbar; and/or wherein
said at least one unidirectional valve allows creating an over-pressure inside the impermeable bag variable from 3 to 9 mbar; and/or wherein
said at least one impermeable bag delimits internally an impermeable bag inner volume of at least 500 litres; and/or wherein
said impermeable bag comprises at least one unidirectional valve, said valve allows creating an over-pressure inside the impermeable bag variable from 10 to 40 mbar; and/or wherein said impermeable bag comprises at least one unidirectional valve, said valve allows creating an over-pressure inside the impermeable bag variable from 20 to 60 mbar; and/or wherein said impermeable bag comprises at least one unidirectional valve, said valve allows creating an over-pressure inside the impermeable bag variable from 10 to 60 mbar; and/or wherein said impermeable bag comprises at least one unidirectional valve, said valve allows creating an over-pressure inside the impermeable bag variable from 3 to 9 mbar; and/or wherein said at least one one-way valve are at least two one-way valves applied to said impermeable bag; and/or wherein said impermeable bag inner volume is between 1100-1600 litres; and/or wherein said impermeable bag inner volume is filled to 60%-80% in volume with roasted coffee beans; and/or wherein said impermeable bag inner volume is filled with 350-450 kg of roasted coffee beans.

3. Packaging assembly according to claim 1, wherein said impermeable bag is a die cut; and/or wherein said impermeable bag comprises an impermeable bag side wall portion; and/or wherein said impermeable bag side wall portion has a cross-section, at a longitudinal extension of the sack, of a quadrangular shape; and/or wherein said impermeable bag side wall portion has four, flat lateral surfaces; and/or wherein said impermeable bag side wall portion is a tubular shape; and/or wherein said impermeable bag side wall portion has impermeable bag heat sealings to delimit at least four corners; and/or wherein said impermeable bag comprises an impermeable bag bottom portion; and/or wherein said impermeable bag comprises a closable impermeable bag mouth portion which defines an impermeable bag opening or loading mouth for introducing roasted coffee beans in the at least one impermeable bag; and/or wherein said at least one-way valve is applied to said at least one impermeable bag side wall portion; and/or wherein said impermeable bag mouth portion connects said side wall portion to said loading mouth by means of conical walls having a linear shape so as to facilitate the loading of roasted beans preventing them from stopping or slowing down at the mouth of said impermeable bag; and/or wherein the angle between the extension of the side wall portion and the linear conical wall mouth portion is between 20° and 30°, preferably 25°; and/or wherein;

a longitudinal axis of the impermeable bag passes through the loading mouth and wherein, in an extended position of the impermeable bag, the transverse dimension of side wall with a longitudinal axis of the side wall portion has a dimension at least three times the transverse dimension of the loading mouth; and/or wherein said impermeable bag is die-cut and comprises a plurality of walls welded and/or heat-sealed together; and/or wherein said impermeable bag has oxygen permeability less than 0.1 cubic centimetres/m$^2$/24 h at 23° C. 0% RH (relative humidity); and/or wherein said impermeable bag it has water vapour permeability lower than 0.1 gr/m$^2$/24 h at 38° C. and 90% RH; and/or wherein said impermeable bag comprises a polylaminate material body; and/or wherein said impermeable bag comprises at least one wall comprising at least one sheet of aluminium; and/or wherein said impermeable bag comprises at least one wall comprising:

polyester 12 micro-metres thick, aluminium 6.35 micro-metres thick oriented polyamide 15 micro-metres thick COEX polyethylene 110 micro-metres thick or a bi-oriented, co-extruded, polyethylene film 110 micro-metres thick; and/or wherein said sheets are polylaminated with polyurethane adhesive.

4. Packaging assembly according to claim 1, wherein:

the assembly comprises roasted coffee beans placed inside the impermeable bag; and/or wherein the impermeable bag inner volume is filled to 60-80% with roasted coffee beans; and/or wherein said impermeable bag is filled with 350-450 kg of roasted coffee beans.

5. Packaging assembly according to claim 1, wherein:

said inner volume of impermeable bag contains nitrogen N2 in an amount such as to reduce the amount of oxygen inside the volume of impermeable bag; and/or wherein said impermeable bag inner volume is rinsed with 2 cubic metres of nitrogen with the sack open so as to present washed roasted beans; and/or wherein said roasted beans contained in said impermeable bag are rinsed with nitrogen at least 3-4 times;

said inner volume of impermeable bag, when sealed, contains nitrogen N2 in an amount such as to reduce the amount of oxygen to values lower than 6% in volume of the impermeable bag; and/or wherein with the impermeable bag sealed and containing roasted coffee beans, the amount of oxygen present in the impermeable bag inner volume is less than 6% of the impermeable bag inner volume; and/or wherein with the impermeable bag sealed and containing roasted coffee beans, the amount of oxygen present in the impermeable bag inner volume is less than 5% of the impermeable bag inner volume.

6. Packaging assembly according claim 1, wherein:

said assembly comprises at least one protection and transport sack; and/or wherein said at least one protection and transport sack is fitted over said at least one impermeable bag as protection against the risks of damaging the impermeable bag and to facilitate its handling; and/or wherein said protection and transport sack is a Flexible Intermediate Bulk Container, FIBC, for the transport of bulk items; and/or wherein said protection and transport sack comprises loops or handles; and/or wherein said at least one inspection window is placed near the bottom edge of the wall; and/or wherein said protection and transport sack comprises a tubular protection and transport sack wall; and/or comprises a protection and transport sack bottom with a closable protection and transport sack discharging or unloading opening; and/or comprises a protection and transport sack loading portion delimiting a closable protection and transport sack loading opening, preferably mechanically closable; and/or wherein said protection and transport sack comprises a protection and transport sack closure, preferably a knot or a tie, tied around said protection and transport sack loading portion; and/or wherein said protection and transport sack has a parallelepiped shape; and/or wherein said protection and transport sack is in the shape of a cylinder; and/or wherein said protection and transport sack comprises a longitudinal axis; and/or wherein said protection and transport sack presents a cross-section to said longitudinal axis of a quadrangular shape; and/or wherein said handles are provided near four corners of the protection and transport sack; and/or wherein said protection and transport sack comprises a body in tubular fabric, preferably sewn defining corners; and/or wherein said protection and transport sack comprises a body which comprises polypropylene; and/or wherein said protection and transport sack comprises a body comprising fabric comprising polypropylene; and/or wherein said protection and transport sack comprises a body which comprises at least a layer comprising polypropylene; and/or wherein said protection and transport sack comprises a body which comprises at least a layer comprising raffia fabric; and/or wherein said protection and transport sack comprises a body which comprises at least a layer comprising a jute and/or non-woven fabric.

7. Packaging assembly according claim 1, wherein:

the assembly comprises at least one self-supporting container defining a self-supporting container inner volume closable, or avoiding to close it, with a self-supporting container lid and a self-supporting container bottom in which at least one impermeable bag is inserted on which at least one protection and transport sack is fitted; and/or wherein said self-supporting container is of the OCTABIN type; and/or wherein said self-supporting container is of the pallet size box type; and/or wherein said self-supporting container is punched or die-cut; and/or wherein said self-supporting container comprises a body comprising at least one corrugated cardboard layer; and/or wherein said self-supporting container comprises die-cut self-supporting container walls; and/or wherein said self-supporting container walls comprise glued joints, avoiding hooks or clips or staples; and/or wherein said self-supporting container comprises a self-supporting container bottom which comprises a self-supporting container bottom edge folded into a self-supporting container walls containment element; and/or wherein said self-supporting container walls are inserted in said self-supporting container bottom and rest thereon at the self-supporting container bottom edge; and/or wherein said self-supporting container comprises a self-supporting container lid which comprises a self-supporting container lid edge folded into a self-supporting container walls containment and closure element; and/or wherein one avoids closing said self-supporting container with a self-supporting container lid; and/or wherein said self-supporting container lid is fitted to the self-supporting container walls; and/or wherein one avoids fitting said self-supporting container lid on the self-supporting container walls; and/or wherein at least one wall of the self-supporting container comprises at least one inspection window forming a through opening; and/or wherein at least one of the self-supporting container walls comprises at least two windows; and/or wherein said at least one inspection window is placed near the upper edge of the wall; and/or wherein said at least one inspection window is placed near a lower edge of the wall near the self-supporting container bottom; and/or wherein said at least one window is placed 200-300 mm from the edge of the self-supporting container wall; and/or wherein said self-supporting container wall comprises an upper window and a lower window; and/or wherein said upper window is used to test the tight sealing of the impermeable bag containing the coffee in over-pressure; and/or wherein said lower window is used to insert a needle probe into the protection and transport sack and into the impermeable bag and test the gases inside the impermeable bag; and/or wherein said packaging assembly comprises at least one transport pallet which the self-supporting container rests on; and/or wherein said packaging assembly comprises straps or blocking ties which embrace said self-supporting container, closing it; and/or wherein said pallet straps also embrace said transport pallet, making the assembly integral and stabilising it; and/or wherein said packaging assembly comprises at least one stretch film wrapped around the self-supporting container to protect, waterproof and stabilise it; and/or wherein said at least one stretch film is also wrapped around the transport pallet to support and stabilise the assembly; and/or wherein said self-supporting container wall comprises an upper window and a lower window; and/or wherein said upper window is used to test the seal of the impermeable bag containing the coffee under vacuum; and/or wherein said upper window is used to test the tight sealing of the impermeable bag containing the coffee in over-pressure; and/or wherein said lower window is used to insert a needle probe into the protection and transport sack and into the impermeable bag and test the gases inside the impermeable bag; and/or wherein said packaging assembly comprises at least one transport pallet on which rests the protection and transport bag within which the at least one impermeable bag is inserted in which is placed roasted and ground coffee; and/or wherein said packaging assembly comprises strapping, or locking bands, which embrace closing said protection and transport bag; and/or wherein said packaging assembly comprises at least one stretchable film wrapped around said protection and transport bag to protect, waterproof and stabilise it.

8. Packaging assembly according to claim 1, wherein
the assembly comprises at least one unidirectional fitting for extraction of fluids comprising air and to create an internal depression between −50 mbar and −400 mbar; and/or wherein
said inner volume, when said at least one impermeable bag is closed and sealed, is under vacuum with depression between −50 mbar to −400 mbar; and/or wherein
said unidirectional fitting for extraction of fluids comprises a filter to prevent the ground coffee from being aspirated during the formation of the depression in the volume; and/or wherein
said unidirectional fitting for extraction of fluids comprises a non-return valve that prevents air from entering into the impermeable bag; and/or wherein
said unidirectional fitting for extraction of fluids is placed in or near a mouth portion of impermeable bag of the impermeable bag; and/or wherein
said inner volume of impermeable bag is filled with roasted and ground coffee and said unidirectional fitting for extraction of fluids is placed at least 50 cm above the roasted and ground coffee; and/or wherein
said inner volume of impermeable bag is a single volume and is filled with roasted and ground coffee for at least 400 kg; and/or wherein
said assembly comprises said at least one unidirectional valve that further allows creating an over-pressure inside the impermeable bag variable from 10 to 60 mbar.

* * * * *